United States Patent
Yoshida

(10) Patent No.: US 10,901,582 B2
(45) Date of Patent: Jan. 26, 2021

(54) INFORMATION PROCESSING APPARATUS, COMMUNICATION SYSTEM, AND IMAGE PROCESSING METHOD

(71) Applicant: Eiichiro Yoshida, Kanagawa (JP)

(72) Inventor: Eiichiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 30 days.

(21) Appl. No.: 16/254,649

(22) Filed: Jan. 23, 2019

(65) Prior Publication Data

US 2019/0235715 A1     Aug. 1, 2019

(30) Foreign Application Priority Data

Jan. 29, 2018  (JP) ................................ 2018-013120

(51) Int. Cl.
| | |
|---|---|
| *G06F 3/0484* | (2013.01) |
| *G06F 9/451* | (2018.01) |
| *H04L 29/06* | (2006.01) |
| *H04N 1/00* | (2006.01) |
| *G06F 3/14* | (2006.01) |

(52) U.S. Cl.
CPC .......... *G06F 3/0484* (2013.01); *G06F 3/1454* (2013.01); *G06F 9/451* (2018.02); *H04L 65/4015* (2013.01); *H04N 1/0035* (2013.01)

(58) Field of Classification Search
CPC ...... G06F 3/0484; G06F 3/1454; G06F 9/451; H04N 1/0035; H04L 65/4015
See application file for complete search history.

(56) References Cited

U.S. PATENT DOCUMENTS

| | | | |
|---|---|---|---|
| 2004/0083236 A1* | 4/2004 | Rust | .................... G06Q 10/10 |
| 2006/0277255 A1 | 12/2006 | Orsolini et al. | |
| 2008/0229327 A1 | 9/2008 | Yoshida | |
| 2009/0100061 A1 | 4/2009 | Yoshida | |
| 2009/0228487 A1 | 9/2009 | Yoshida | |
| 2010/0131868 A1* | 5/2010 | Chawla | ................ G06F 3/0481 715/759 |

(Continued)

FOREIGN PATENT DOCUMENTS

| | | |
|---|---|---|
| JP | 2009-027656 | 2/2009 |
| JP | 2013-059118 | 3/2013 |
| JP | 2015-118425 | 6/2015 |

OTHER PUBLICATIONS

Snagit Getting Started Guide, 2014, available online at https://assets.techsmith.com/Docs/pdf-snagit/Snagit_12_GSG.pdf and at https://web.archive.org/web/20160817105426/https://assets.techsmith.com/Docs/pdf-snagit/Snagit_12_GSG.pdf, pp. 1-13, hereinafter Snagit.*

(Continued)

*Primary Examiner* — Matthew Ell
(74) *Attorney, Agent, or Firm* — Oblon, McClelland, Maier & Neustadt, L.L.P.

(57) ABSTRACT

An information processing apparatus controls display of a plurality of applications on a screen. The information processing apparatus includes circuitry to: acquire first image data that at least includes a display area of a first application displayed on the screen; acquire information on the display area of the first application; and generate second image data that includes at least a part of the first image data based on the information on the display area of the first application.

16 Claims, 14 Drawing Sheets

(56) References Cited

U.S. PATENT DOCUMENTS

| | | | |
|---|---|---|---|
| 2010/0311394 A1* | 12/2010 | Pomerantz | H04L 67/04 455/414.1 |
| 2013/0067037 A1 | 3/2013 | Yoshida et al. | |
| 2013/0139270 A1 | 5/2013 | Yoshida | |
| 2014/0040767 A1 | 2/2014 | Bolia | |
| 2014/0101675 A1* | 4/2014 | VanBlon | G06F 9/451 719/319 |
| 2014/0223132 A1 | 8/2014 | Yoshida | |
| 2017/0300286 A1* | 10/2017 | Lieb | H04L 67/101 |

OTHER PUBLICATIONS

Extended European Search Report dated Jun. 26, 2019 in European Patent Application No. 19 153 034.4, 13 pages.
Strahl, R., "Building a SnagIt Screen Capture Plugin for Live Writer," Mar. 19, 2007, XP055597438, URL:https://weblog.westwind.com/posts/2007/mar/19/building-a-snagit-screen-capture-plugin-for-live-writer, 16 pages.
Nash, P., "Screen capture in Google Chrome," Oct. 12, 2017, XP055597520, URL:https://www.twilio.com/blog/2017/10/screen-capture-in-google-chrome.html, 14 pages.
Lew, D., "How to implement my very own URI scheme on Android," Mar. 15, 2010, XP055597378, URL:https://stackoverflow.com/questions/2448213/how-to-implement-my-very-own-uri-scheme-on-android, 4 pages.
"Snagit 12 COM Server Document," Nov. 1, 2014, XP055597154, URL:https://assets.techsmith.com/Docs/pdf-snagit/Snagit_COM_Server_12.0.pdf, 66 pages.

* cited by examiner

FIG. 7A

```
MANIFEST OF AUXILIARY APP

<intent-filter>
1    <action android:name="android.intent.action.VIEW" />
2    <category android:name="android.intent.category.DEFAULT" />
3    <category android:name="android.intent.category.BROWSABLE" />
4    <data android:scheme="subapp" android:host="filepath" />
</intent-filter>
```

FIG. 7B

```
CUSTOM URI SCHEME
subapp://filepath?id=/foo/bar/001/001.jpg
```

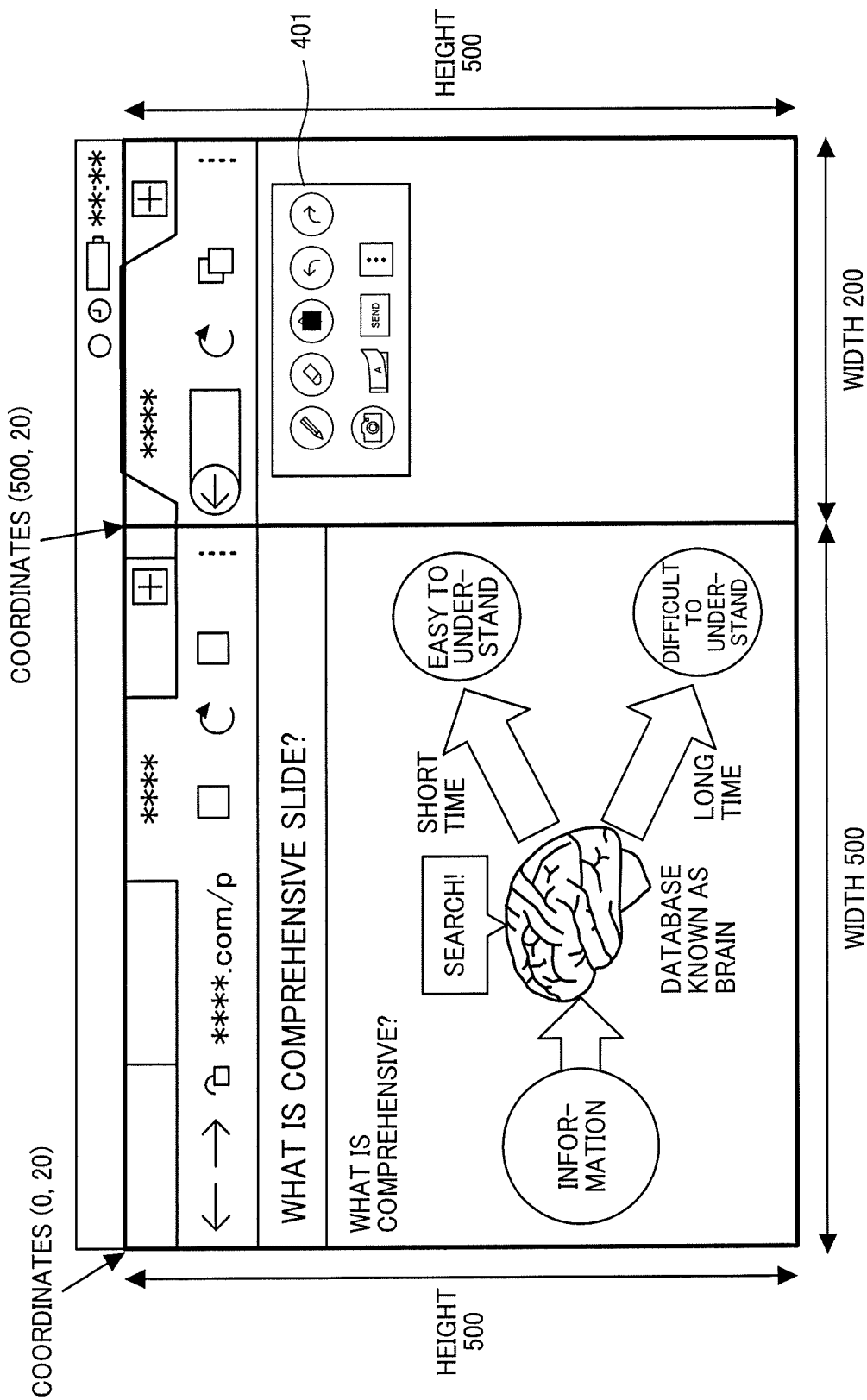

FIG. 9B

WINDOW INFORMATION OF APPLICATION

| APPLICATION NAME | WINDOW X COORDINATE | WINDOW Y COORDINATE | WINDOW WIDTH | WINDOW HEIGHT |
|---|---|---|---|---|
| DOCUMENT DISPLAY APPLICATION | 0 | 20 | 500 | 500 |
| WHITEBOARD APPLICATION | 500 | 20 | 200 | 500 |

```
<canvas id="c1" width="300" height="300"></canvas>
```

```
1    var canvas = document.getElementById('c1');
2    var ctx = canvas.getContext('2d');
```

```
ctx.drawImage(img, x,y)
```

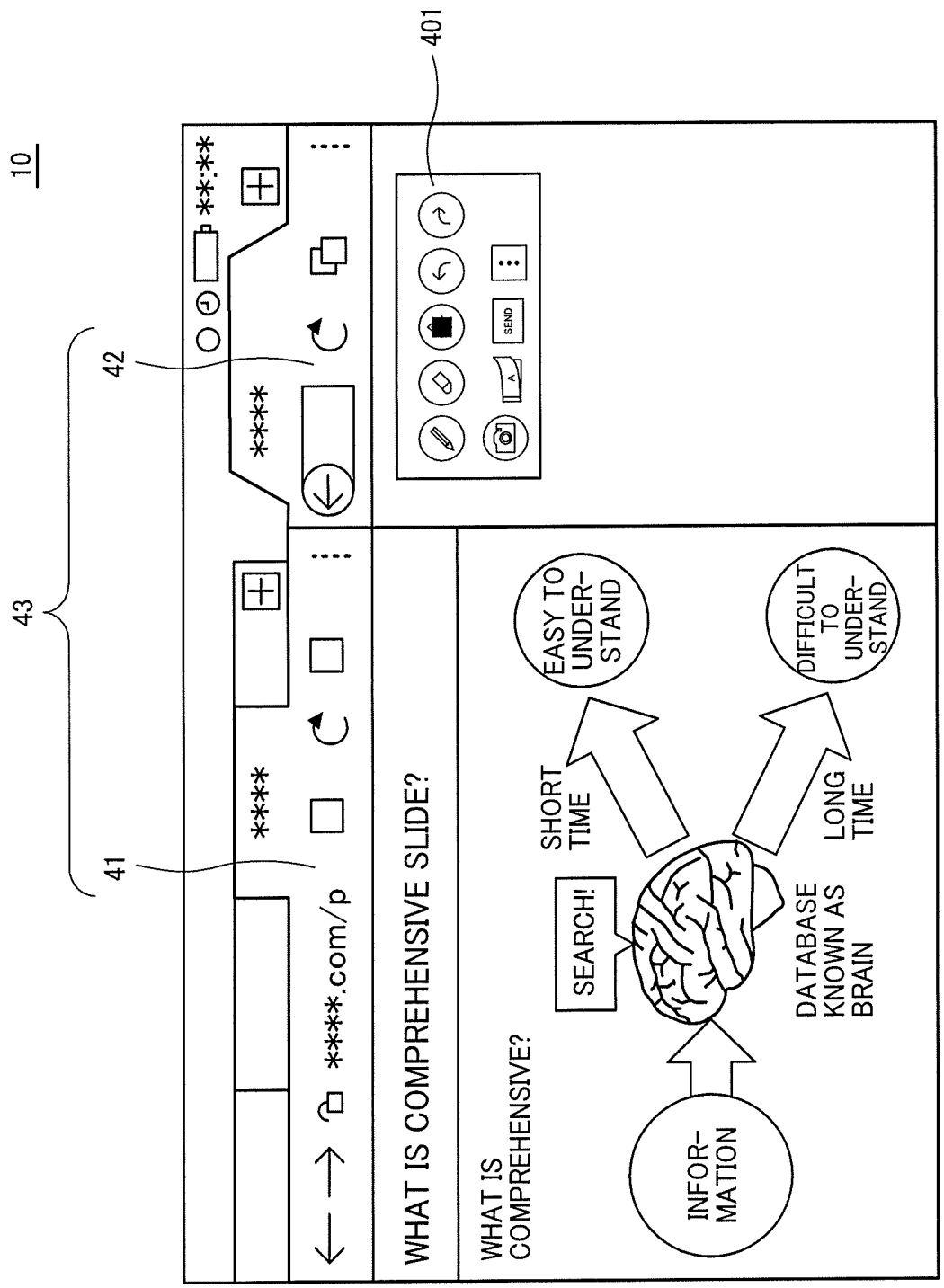

INFORMATION PROCESSING APPARATUS, COMMUNICATION SYSTEM, AND IMAGE PROCESSING METHOD

CROSS-REFERENCE TO RELATED APPLICATION

This patent application is based on and claims priority pursuant to 35 U.S.C. § 119(a) to Japanese Patent Application No. 2018-013120, filed on Jan. 29, 2018, the entire disclosure of which is incorporated herein by reference.

BACKGROUND

Technical Field

The present disclosure relates to an information processing apparatus, a communication system, and an image processing method.

Description of the Related Art

An information processing apparatus having an operating system (OS) that supports multitasking can execute a plurality of applications concurrently and simultaneously display screens of the plurality of applications on a display device. The plurality of applications seems to run simultaneously from a perspective of a user, and the user can select the screen of the desired application to operate the respective application.

SUMMARY

An information processing apparatus controls display of a plurality of applications on a screen. The information processing apparatus includes circuitry to: acquire first image data that at least includes a display area of a first application displayed on the screen; acquire information on the display area of the first application; and generate second image data that includes at least a part of the first image data based on the information on the display area of the first application.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 7A and 7B are explanatory views of an example of a custom URI scheme according to an embodiment of the present disclosure;

FIGS. 9A and 9B are diagrams for providing supplemental expiation of an area to be trimmed according to an embodiment of the present disclosure;

FIGS. 12A and 12B are views illustrating display examples of the image data displayed by the whiteboard application according to an embodiment of the present disclosure;

Figure 1:
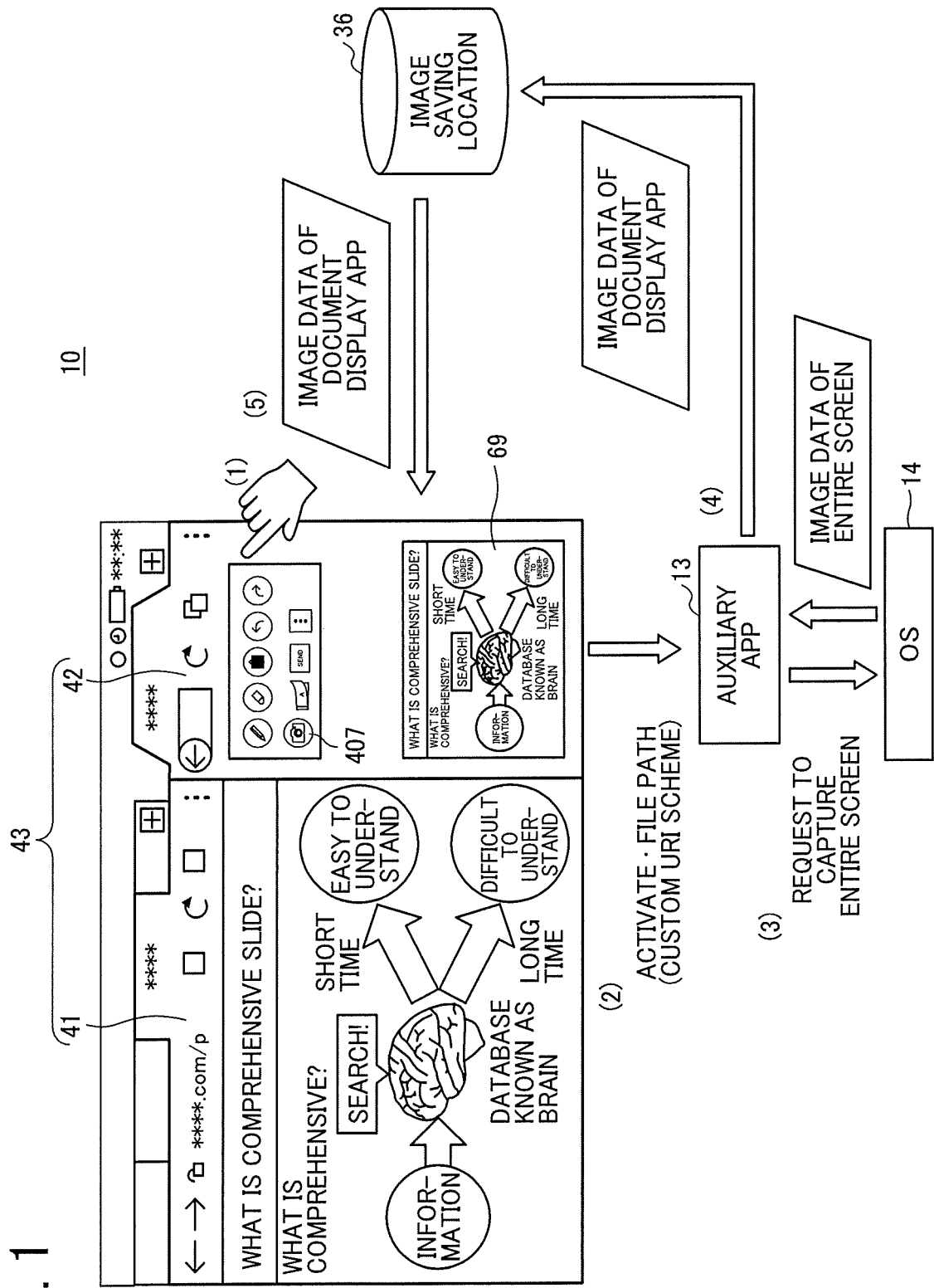
FIG. 1 is an explanatory diagram of a method for capturing one of screens of two applications running on an information processing apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Conventionally, for example, a mobile terminal is known that simultaneously displays a screen of an application for writing an electronic mail and a screen of an application for playing music data on the display device.

In such a conventional technique, a part of the screen cannot easily be captured. For example, there is a case where, in a state where screens of an application A and an application B are simultaneously displayed on the display device, the user wishes to capture the screen of one of the application A and the application B. An example of such a case is that, when the application B is a document display application, the user wishes to use information displayed by the document display application. The user can display image data of the screen of the document display application on the application A or transmit the image data to extraneous sources.

Conventionally, to address such a demand, the user has to use a function provided by the OS to capture an entire screen of the display device and to specify and trim a portion corresponding to the screen of the application B from image data of the entire screen with a mouse or the like. In order to allow the application A to use the image data of the screen of the application B, the user performs a further operation to make the application A read the image data. Just as described, the user has to perform various types of operations and thus is required to put a great deal of effort.

A description is given hereinafter of an information processing apparatus 10 and an image processing method executed by the information processing apparatus 10 according to one or more embodiments of the present disclosure, with reference to drawings.

<Display Example of Screens of Plurality of Applications and Capturing Screen of Application>

A description is given of a display example of screens of a plurality of applications with reference to FIG. 1. FIG. 1 is an explanatory diagram of a method for capturing one of screens of two applications running on the information processing apparatus 10 according to the present embodiment. In FIG. 1, a document display application (an example of a first application) and a whiteboard application (an example of a second application) are running, and a screen 41 of the document display application and a screen 42 of a whiteboard application are displayed. The whiteboard application is an application that is used like a whiteboard, and a user can paste image data to the whiteboard application in addition to handwriting characters and the like on the whiteboard application. Although it is not apparent from FIG. 1, the whiteboard application communicates with a server and shares the screen with the whiteboard application at another site. A site is a place where activities mainly take place. At least one of an installation location of the information processing apparatus and a location of the user is referred to as the site.

The document display application displays a document shared at a meeting, for example. There is a case where the user wishes to paste this document to the whiteboard application, share the document with meeting participants at the other site, and use the whiteboard application to write notes and the like on the pasted image. In the background art, the user has to input an operation of capturing an entire screen 43 of a display device to the information processing apparatus 10 and then trim only the screen 41 of the document display application from image data of the entire screen 43.

It is desired that the whiteboard application automatically performs such an operation. However, because the whiteboard application is a web application as will be described below, capturing of the entire screen 43 (or only the screen 41 of the document display app) is undesirable from a security perspective while capturing of the screen 42 of the whiteboard application is allowed. This is because, if capturing of the entire screen 43 is allowed, the web application acquires any screen of the information processing apparatus that acquires the web application, that is, the information processing apparatus connected to a URL for acquiring the web application, and image data of such a screen can be transmitted to an external device specified by the web application, which possibly results in the undesirable web application from the security perspective.

To handle such a problem, in the present embodiment, an auxiliary application 13 (an example of a third application) capable of capturing the entire screen 43 is prepared. Because the auxiliary application 13 is a native application (not a web app) running on the information processing apparatus 10, the auxiliary application 13 can capture the entire screen 43. The auxiliary application 13 can request an operating system (OS) 14 to capture the entire screen 43 and save the image data in a file path (an example of saving location specifying information) that is notified from the whiteboard application.

However, use of the auxiliary application 13 leads to the following disadvantages. In general, different applications on the OS 14 cannot communicate with each other. Thus, the whiteboard application and the auxiliary application 13 cannot communicate with each other, and the whiteboard application cannot notify the auxiliary application 13 of the file path. The file path only needs to indicate a logical location of a file and may indicate a location of a particular file in the information processing apparatus. Alternatively, the auxiliary application 13 may function as a server, the file may be placed on the server, and the file path may specify a URL indicating a location of the file on the server.

While inter-process communication or the like is possible depending on the OS 14, a disadvantage such as an unstable operation is significant. Thus, arbitrary communication between applications is difficult in the OS 14 running on the general-purpose information processing apparatus 10.

In view of the above, in the present embodiment, the whiteboard application uses a mechanism of a custom Uniform Resource Identifier (URI) scheme provided by the OS 14 so as to notify the auxiliary application 13 of the file path. The custom URI scheme will be described later.

An overview of operation by the information processing apparatus 10 having the above configuration will be described.

(1) When the user wishes to capture the screen 41 of the document display application, the user presses a capture button 407.

(2) The whiteboard application uses the custom URI scheme to activate the auxiliary application 13 and notify the auxiliary application 13 of the file path.

(3) The auxiliary application 13 requests the OS 14 to capture the entire screen 43. The OS 14 captures the entire screen 43 and provides the image data (an example of first image data) to the auxiliary application 13. The auxiliary application 13 acquires a display area of the document display application acquired from the OS 14, trims the image data, and creates image data of the screen 41 of the document display application (an example of second image data).

(4) The auxiliary application 13 saves the image data of the screen 41 of the document display application in an image saving location 36 specified by the file path.

(5) The whiteboard application acquires the image data of the screen 41 of the document display application from the image saving location 36 and transmits the image data of the screen 41 of the document display application to the server. Consequently, the server generates and transmits screen information including the image data of the screen 41 of the document display application to the whiteboard application. In this way, the whiteboard applications at the sites can share the image data of the screen 41 of the document display application.

As described above, the information processing apparatus 10 according to the present embodiment can capture the screen 41 of the document display application, which is displayed on the display device with the whiteboard application and display the screen 41 of the document display application on the screen 42 of the whiteboard application by using the auxiliary application 13, the custom URI scheme, and the like. Even when the screen 42 of the whiteboard application is not displayed on the display device, the image data of the screen 41 of the document display application can be shared.

Terms

The display device is a device that displays an image. The display device will also be referred to as a display. The display device may be a projector.

Information on the display area is information that determines, specifies, identifies, or estimates an area in the display device occupied by the screen of the application. In the present embodiment, the information on the display area will be described as window information.

Cutting out the image data means to capture a part of an image by dividing the image data or cutting out a part of the image data. Cutting out the image data will also be referred to as trimming.

The whiteboard application is a program. The whiteboard indicates at least one of a function realized by the whiteboard application and a screen displayed by the whiteboard application. There is a case where the whiteboard application and the whiteboard are substantially the same and thus are not clearly distinguished from each other.

<System Configuration Example>

Figure 2:
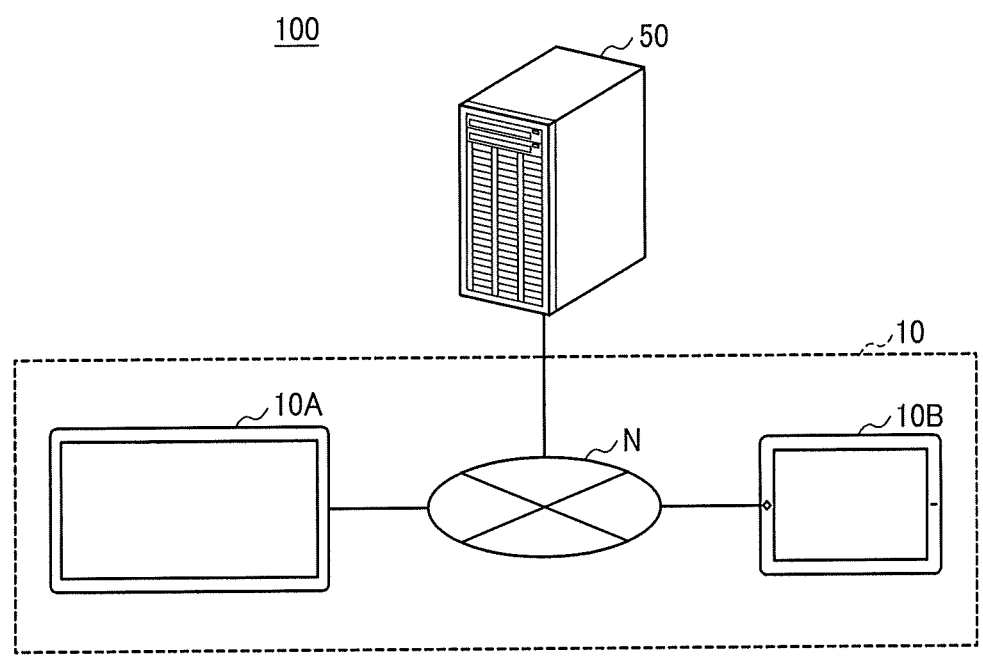
FIG. 2 is a schematic diagram illustrating an example of a configuration of a communication system according to an embodiment of the present disclosure.

FIG. 2 is an example of a schematic configuration diagram of a communication system 100 according to the present embodiment. The communication system 100 includes an information terminal 10A, an information terminal 10B, and a server 50 that can communicate with each other via a network N. Each of the information terminal 10A and the information terminal 10B is an example of the information processing apparatus 10 described with reference to FIG. 1. While the two information processing apparatuses 10 are illustrated in FIG. 2, provision of at least one of the information processing apparatuses 10 may be sufficient. Alternatively, the three or more information processing apparatuses 10 may be provided.

Each of the information terminal 10A and the information terminal 10B includes a touchscreen. The touchscreen of the information terminal 10A is large while the touchscreen of the information terminal 10B is small. However, the touchscreens of the information terminal 10A and the information terminal 10B are the same in that the user can handwrite on the screen with a finger, a pen, and the like. The touchscreens of the information terminal 10A and the information terminal 10B may be in same size, and FIG. 2 merely illustrates an example. In the case of a large screen, the touchscreen of a type suitable for the large screen may be mounted. The touch screen of any of the types suitable for the large screen may be adopted for the touchscreen.

Each of the information terminals 10A and 10B can be implemented by a general-purpose information processing apparatus. Examples of the information terminals 10A and 10B include, without limitation, a tablet terminal, a smartphone, a laptop (a personal computer), or a personal digital assistant (PDA), for example. One or more of the information processing apparatuses 10 can be an electronic board, an information board, an electronic whiteboard, or the like.

Since the information processing apparatus 10 according to the present embodiment includes the touchscreen, the user can handwrite on the touchscreen with his or her finger and a pen. This improves operability for a user. Meanwhile, the user can also handwrite with a mouse in the general-purpose information processing apparatus 10 that does not include a touch screen. For this reason, the touchscreen can be omitted. Hereinafter, a user's finger, a pen, and a mouse are collectively referred to as a pointing device, unless they have to be distinguished from each other.

The server 50 is implemented by one or more information processing apparatus having a function as a web server (or a Hypertext Transfer Protocol (HTTP) server) that transmits the screen information to each of the information processing apparatuses 10. Furthermore, the server 50 provides a web application executed by the information processing apparatus 10. The web application refers to one of software and a mechanism of the software that is operated by cooperation between a program based on a script language (for example, JavaScript®) running on a web browser and a program on the web server side, and that is used on the browser.

The server 50 generates the screen information from handwritten information that is transmitted by one of the information processing apparatuses 10, and transmits the screen information to each of the information processing apparatuses 10. Thus, when the user runs the whiteboard application on the information processing apparatus 10, the user can share the handwritten information with the information processing apparatuses 10 at the other sites. The whiteboard application is the web application. The whiteboard application is the web application. Thus, as long as the web browser can run on the information processing apparatus 10, information can be shared.

The server 50 may be compatible with cloud computing. The cloud computing is a use mode in which resources on the network are used without being conscious of particular hardware resources.

The network N may include one or more local area networks (LANs) inside a firewall or may include the Internet outside the firewall in addition to the LAN. Alternatively, the network N may include at least one of a virtual private network (VPN) and wide area Ethernet®. The network N may be set up wired, wireless, or a combination of wired or wireless. Meanwhile, in the case where at least one of the information processing apparatuses 10 is connected to the server 50 by a cellular phone network such as 3G, Long Term Evolution (LTE), or 4G, the LAN may not be provided.

<Example of Hardware Configuration>
<<Information Terminal>>

Figure 3:
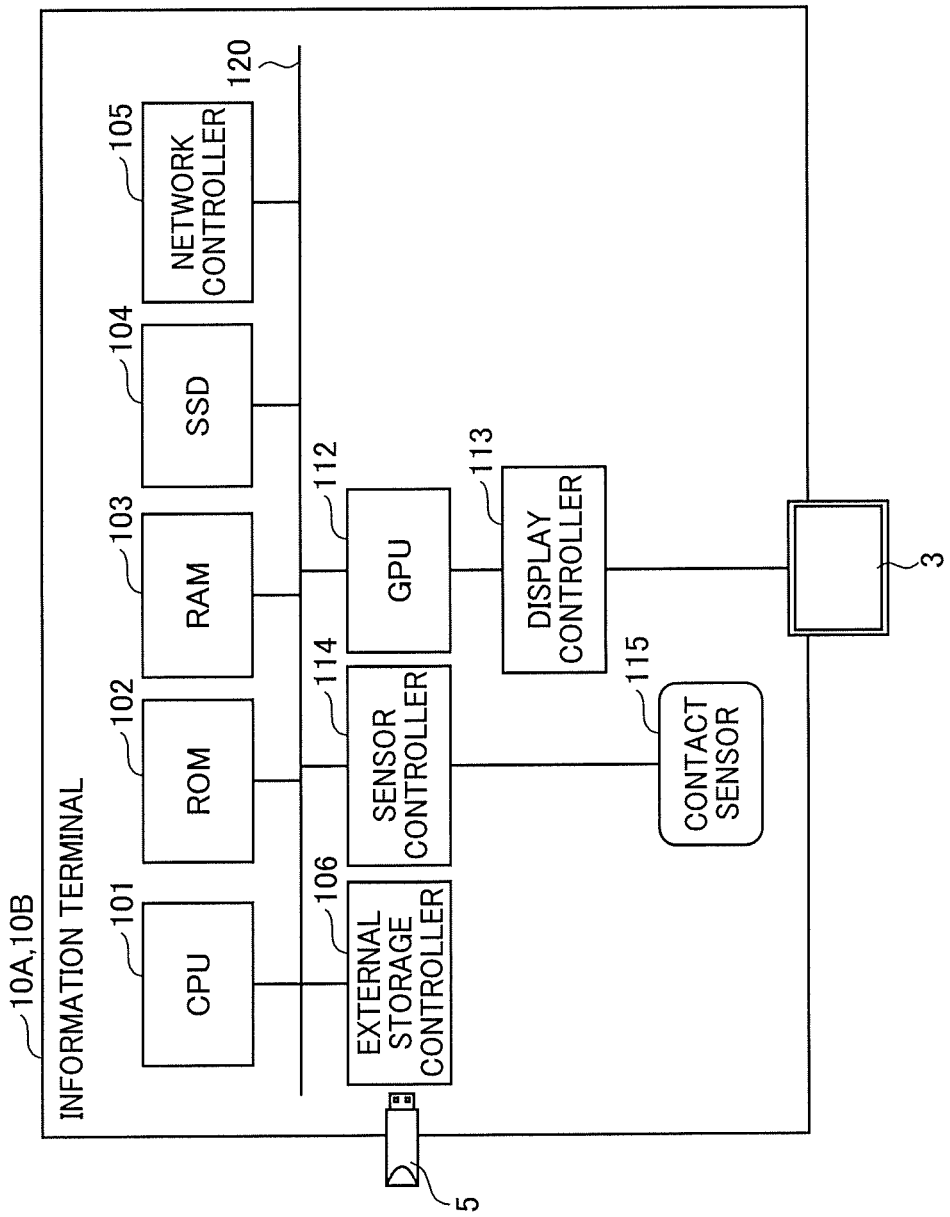
FIG. 3 is a bock diagram illustrating an example of a hardware configuration of an information terminal according to an embodiment of the present disclosure.

A description will be made on a hardware configuration of the information terminals 10A and 10B according to the present embodiment with reference to FIG. 3. FIG. 3 is a hardware configuration diagram of the information terminals 10A and 10B according to the present embodiment.

As illustrated in FIG. 3, each of the information terminals 10A and 10B includes: a central processing unit (CPU) 101 that controls overall operation of corresponding one of the information terminals 10A and 10B; a read-only memory (ROM) 102 that stores a program such as an initial program loader (IPL) used to drive the CPU 101; a random access memory (RAM) 103 used as a work area of the CPU 101; a solid-state drive (SSD) 104 that stores various types of data used in the program for corresponding one of the information terminals 10A and 10B; a network controller 105 that controls the communication with the network N; and an external storage controller 106 that controls communication with a USB memory stick 5.

In addition, each of the information terminals 10A and 10B includes: a graphics processing unit (GPU) 112 that specializes in graphics; and a display controller 113 that controls and manages screen display in order to output an output image from the GPU 112 to a display 3.

Furthermore, each of the information terminals 10A and 10B includes: a sensor controller 114 that controls processing by a contact sensor 115; and the contact sensor 115 that detects contact of an electronic pen, a user's hand, and the like on the display 3. For example, the contact sensor 115 detects coordinates of a position contacted by the user in accordance with a change in electrostatic capacity (realizes the touchscreen). The contact sensor 115 is not limited to a touch sensor that adopts a method for detecting the change in the electrostatic capacity, but may be any of various detection units such as a resistive touchscreen determining the contact position by a voltage change of two opposing resistive films and an electromagnetic induction touchscreen detecting electromagnetic induction generated at a time when a contact object contacts a display unit so as to determine the contact position.

Moreover, each of the information terminals 10A and 10B includes bus lines 120 such as an address bus and a data bus used to electrically connect the CPU 101, the ROM 102, the RAM 103, the SSD 104, the network controller 105, the external storage controller 106, a capture device 111, the GPU 112, the sensor controller 114, and an electronic pen controller 116.

The program for the information terminals 10A and 10B may be recorded in a computer readable recording medium such as a CD-ROM for distribution, or may be distributed from a server for program distribution.

<<Server>>

Figure 4:
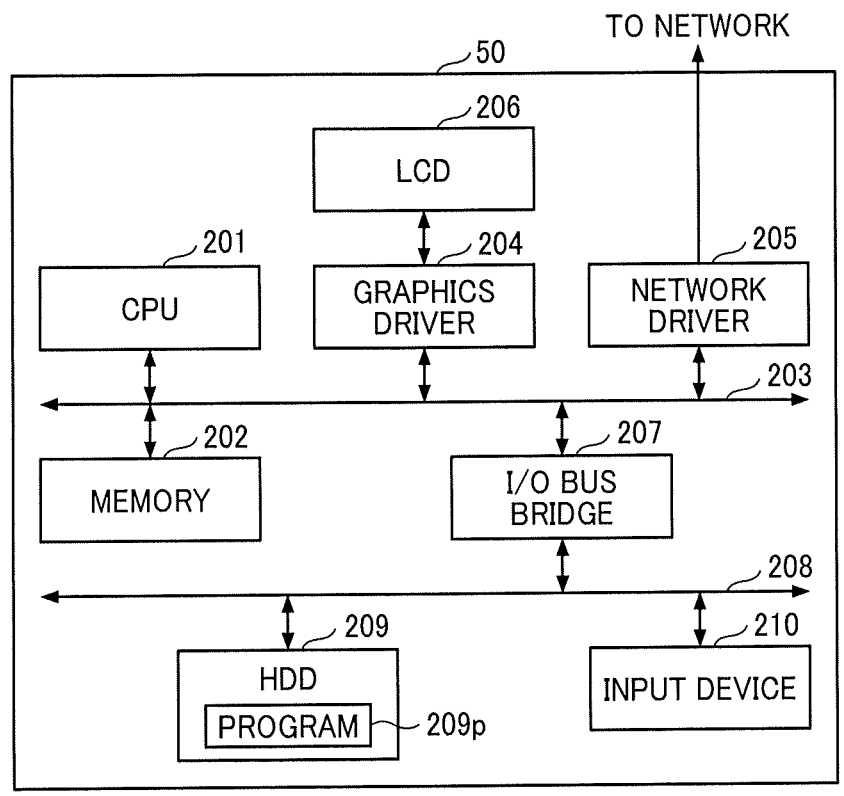
FIG. 4 is a block diagram illustrating an example of a hardware configuration of a server according to an embodiment of the present disclosure.

FIG. 4 is an example of a schematic hardware configuration of the server 50 according to the present embodiment. The server 50 includes a CPU 201 and memory 202 enabling high-speed access of data used by the CPU 201. The CPU 201 and the memory 202 are connected to other hardware elements of the server 50 such as a graphics driver 204 and a network driver (NIC) 205 via a system bus 203.

The graphics driver 204 is connected to a liquid crystal display (LCD) 206 via a bus and monitors a processing result of the CPU 201. The network driver 205 connects the server 50 to the network N at a transport layer level and a physical layer level and establishes a session with the information processing apparatus 10.

An input/output (I/O) bus bridge 207 is further coupled to the system bus 203. A storage device such as a hard disk drive (HDD) 209 is coupled to a downstream side of the I/O bus bridge 207 via an I/O bus 208 such as of peripheral component interconnect (PCI) by Integrated Drive Electronics (IDE), Advanced Technology Attachment (ATA), ATA Packet Interface (ATAPI), serial ATA, a small computer systems interface (SCSI), a USB, or the like. The HDD 209 stores a program 209p that controls the entire server 50. The HDD 209 may be an SSD.

Input devices 210 such as a keyboard and a mouse (referred to as the pointing devices) are each coupled to the I/O bus 208 via the bus such as the USB and receive an input and an instruction from an operator such as a system administrator.

The illustrated hardware configuration of the server 50 may not be accommodated in a single casing or provided as a unitary system, and only illustrates hardware elements preferably provided in the server 50. In addition, in order to be compatible with the cloud computing, the physical configuration of the server 50 according to the present embodiment may not be fixed. The server 50 may be configured that hardware resources are dynamically connected/disconnected in accordance with a load.

<Example of Software Configuration>

Figure 5:
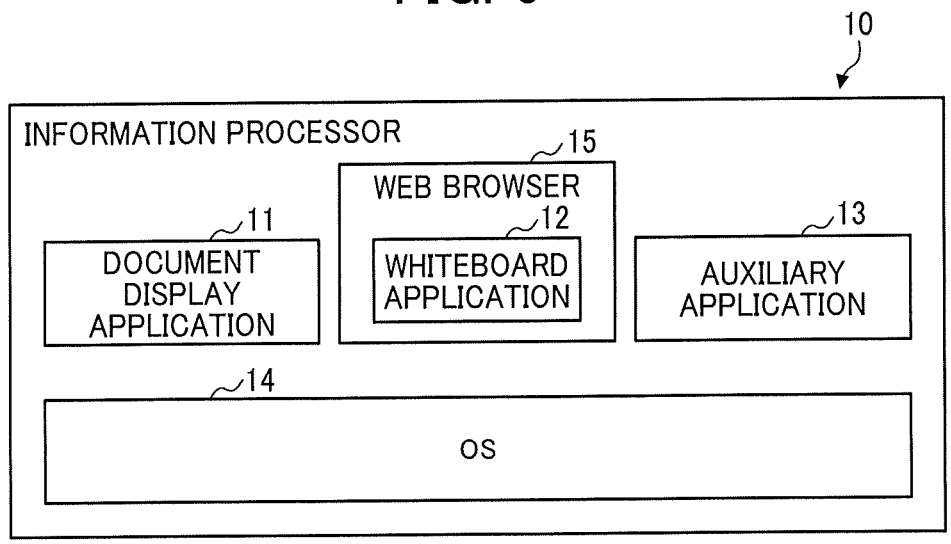
FIG. 5 is a block diagram illustrating an example of a software configuration running on the information processing apparatus according to an embodiment of the present disclosure.

Next, a description will be made on a software configuration of the information processing apparatus 10 with reference to FIG. 5. FIG. 5 illustrates an example of the software configuration running on the information processing apparatus 10 according to the present embodiment. The OS 14 runs on the information processing apparatus 10, and a document display application 11, a whiteboard application 12, and the auxiliary application 13 run on the OS 14.

The OS 14 is one of Android®, iOS®, Windows®, UNIX®, LINUX®, and macOS®, for example. However, the OS 14 is not limited to any of Android®, iOS®, Windows®, UNIX®, LINUX®, and macOS®. In addition, the OS 14 may differ by a model of the information processing apparatus 10.

The document display application 11 is an application that displays a document for a meeting, for example. The document display application 11 may be running on one or more of the plurality of information processing apparatuses 10 used by the meeting participants. The document in the document display application 11 is provided for sharing. What is provided as the document differs by an attribute or a situation of the user. Thus, the document display application 11 only needs to be an application that runs on the OS 14 and displays some kind of the screen. For example, at the meeting, a presentation application could be the document display application 11. In addition, any of the web browser capable of displaying information on the Internet, a word-processing application that edits and displays a document, and a spreadsheet application could also be the document display application 11. Furthermore, any of a photo application that displays photographs, a game application such as of at least one of a local game and an online game, a paint application used by the user to draw a picture, and a file management application could also be the document display application 11. The applications just as described are merely examples of the document display application 11, and the document display application 11 can be any other suitable application.

The whiteboard application 12 is realized when a web browser 15 executes a script running on the web browser 15. The whiteboard application 12 is a web application that provides a whiteboard function to the user. As described above, the whiteboard application 12 has a function of displaying image data of a screen of the document display application 11. The whiteboard application 12 may not have the whiteboard function as long as the whiteboard application 12 has the function of displaying the image data of the screen of the document display application 11. That is, the whiteboard application 12 only needs to be the web application that runs on the information processing apparatus 10.

The auxiliary application 13 provides an auxiliary function for the whiteboard application 12 to display the image data of the screen of the document display application 11. The auxiliary application 13 primarily executes processing that is difficult for the whiteboard application 12. An example of the difficult processing is a function or processing to call up an application interface (API) of the OS 14. While the document display application 11 can be an arbitrary application, it is assumed that the auxiliary application 13 is developed by the same development maker of whiteboard application 12 or a development maker related to the whiteboard application 12. Thus, the auxiliary application 13 and the whiteboard application 12 can cooperate with each other.

The whiteboard application 12 runs on the web browser 15 as a base, and thus dependency of the whiteboard application 12 on the model of the information processing apparatus 10 is low. On the contrary, the auxiliary application 13 cooperates with the OS 14 to acquire the image data of the screen of the document display application 11, and thus has a function that heavily depends on the model of the information processing apparatus 10. Thus, the auxiliary application 13 is the native application. The native application is a term used in contrast to the web application. The native application is a term used in contrast to the web application. The native application is an application that is installed in and executed by the information processing apparatus 10, uses the function of the OS 14, and can control the hardware.

On the contrary, the whiteboard application 12 is the web application, and runs when the script transmitted from the server 50 is executed. Thus, installation of the whiteboard application 12 is unnecessary. Meanwhile, it is often difficult for the web application to use the function of the OS 14 and to control the hardware.

Because the auxiliary application 13 according to the present embodiment only needs to run internally, the auxiliary application 13 does not display a screen in principle. Due to lack of the screen display by the auxiliary application 13, the display device (one of the display 3 and the LCD 206) of the information processing apparatus 10 can effectively be used. In addition, the user may not be conscious of the auxiliary application 13. However, when the user sets operation of the auxiliary application 13, the auxiliary application 13 may exceptionally provide a certain type of the screen.

<Functions>

Figure 6:
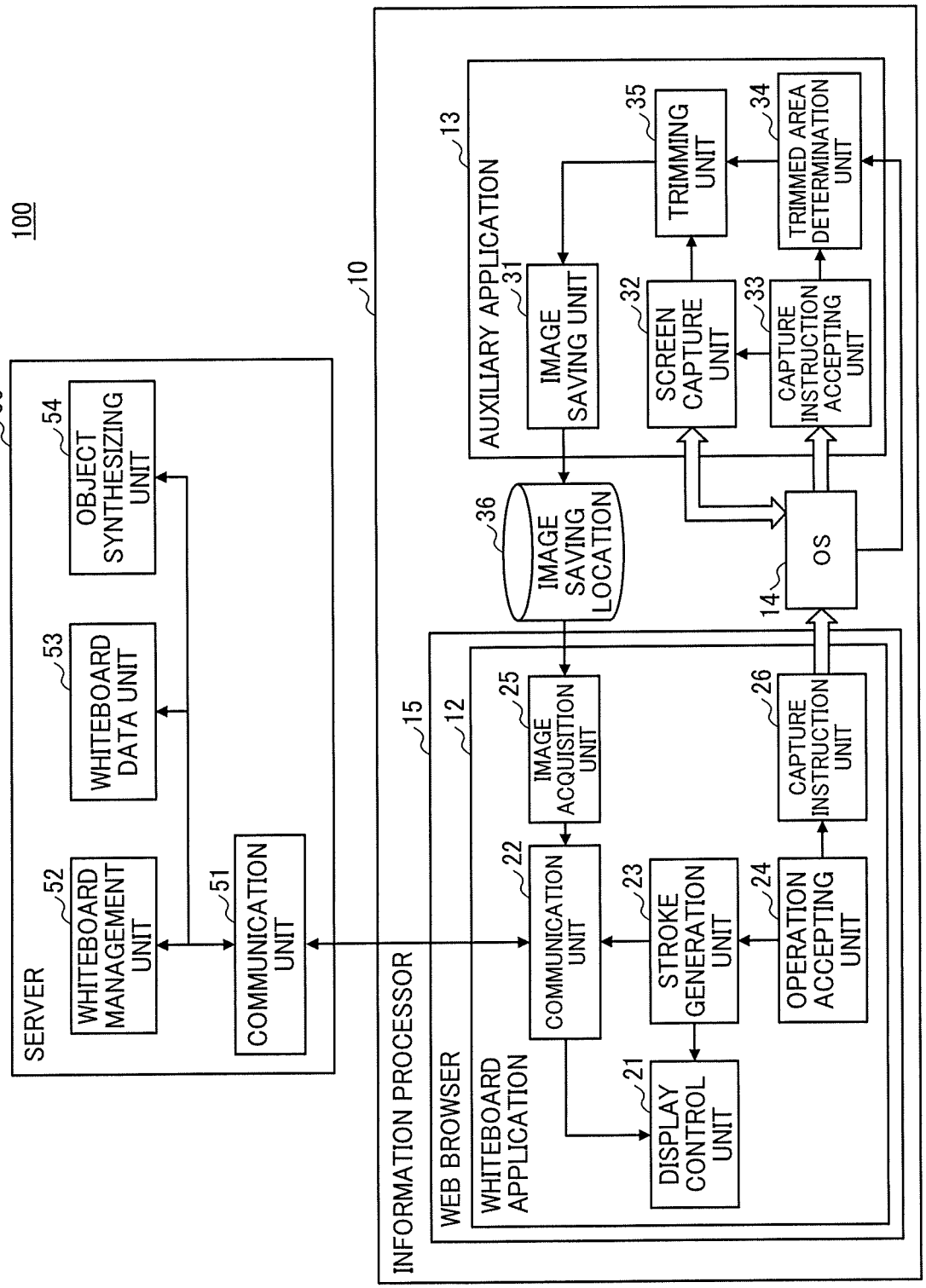
FIG. 6 is a block diagram illustrating an example of a functional configuration of each of the information processing apparatus and the server according to an embodiment of the present disclosure.

Next, a description will be made on the functions of the whiteboard application 12, the auxiliary application 13, and the server 50 with reference to FIG. 6. FIG. 6 is an example of a functional block diagram that illustrates the functions of the information processing apparatus 10 and the server 50 according to the present embodiment in blocks.

FIG. 6 illustrates the functions of the server 50, the whiteboard application 12, the OS 14, and the auxiliary application 13. Because the document display application 11 only needs to have the function of displaying the screen, such a function will be described when necessary.

<<Whiteboard Application>>

The whiteboard application 12 includes a display control unit 21, a communicating unit 22, a stroke generating unit 23, an operation accepting unit 24, an image acquiring unit 25, and a capture instructing unit 26. Each of these units of the information processing apparatus 10 corresponds to at least one of a function and a unit that are realized when any of the components illustrated in FIG. 3 runs by a command from the CPU 101 that follows the program loaded onto the RAM 103 from the SSD 104 and the script transmitted from the server 50.

The communicating unit 22 exchanges various types of information with the server 50. For example, the communicating unit 22 receives the screen information written in at least one of Hypertext Markup Language (HTML), Cascade Style Sheets (CSS), and JavaScript® from the server 50. In addition, the communicating unit 22 transmits the handwritten information input by the user to the server 50.

The operation accepting unit 24 accepts various operations by the user for the whiteboard application 12. For example, the operation accepting unit 24 accepts at least one of pressing of a button displayed in the menu and the handwritten information on the touchscreen.

When being notified from the operation accepting unit 24, the capture instructing unit 26 detects that the user presses the capture button 407 on the screen of the document display application 11, and instructs the auxiliary application 13 to capture the image via the OS 14. The custom URI scheme is used for the instruction. At this time, the capture instructing unit 26 also notifies the auxiliary application 13 of the file path that points to the image saving location 36. The OS 14 activates the auxiliary application 13 and notifies the auxiliary application 13 of the file path. The activated auxiliary application 13 cooperates with the OS 14 to capture the screen of the document display application 11.

The stroke generating unit 23 generates a stroke on the basis of the handwritten information on the touch screen accepted by the operation accepting unit 24. The handwritten information accepted by the operation accepting unit 24 is a list of coordinates of points. Thus, even in the case where the coordinates of the points are displayed as is, a plurality of points is only displayed. Thus, the stroke generating unit 23 couples the points in a color, a thickness, a line type, or the like specified by the user to generate the stroke.

The display control unit 21 analyzes the screen information received by the communicating unit 22 and displays an analysis result on the display device (one of the display 3 and the LCD 206). The display control unit 21 also displays the stroke generated by the stroke generating unit 23 on the display device.

The image acquiring unit 25 acquires the image data of the screen of the document display application 11 from the image saving location 36 that is specified by the file path. The whiteboard application 12 is not notified that the auxiliary application 13 saves the image data in the image saving location 36. Accordingly, the image acquiring unit 25 performs a polled operation for the image saving location 36, so as to acquire the image data of the screen of the document display application 11.

The image saving location 36 is a storage unit provided in the information processing apparatus 10. The image saving location 36 is at least one of the RAM 103 and the SSD 104 illustrated in FIG. 3, for example. The image saving location 36 may be a portable storage unit such as a USB memory stick or an SD memory card. The image saving location 36 may be a storage on the network.

<<Auxiliary Application>>

The auxiliary application 13 includes an image saving unit 31, a screen capture unit 32, the capture instruction accepting unit 33, a trimmed area determining unit 34, and a trimming unit 35. Each of these units of the information processing apparatus 10 corresponds to at least one of the function and the unit that are realized when any of the components illustrated in FIG. 3 runs by the command from the CPU 101 that follows the program loaded onto the RAM 103 from the SSD 104 or the script transmitted from the server 50.

The capture instruction accepting unit 33 accepts a capture instruction provided from the capture instructing unit 26 in the whiteboard application 12 via the OS 14. The capture instruction includes the file path, and the custom URI scheme is used for the capture instruction as described above. The capture instruction accepting unit 33 requests the screen capture unit 32 to capture the entire screen 43 and then requests the trimmed area determining unit 34 to determine an area to be trimmed.

The screen capture unit 32 requests the OS 14 to capture the entire screen 43 of the display device (one of the display 3 and the LCD 206). In response to the request, the OS 14 transmits the image data that includes both of the screen 42 of the whiteboard application 12 and the screen 41 of the document display application 11 to the screen capture unit 32.

The trimmed area determining unit 34 acquires a display position and size of each of the applications displayed on the display device (one of the display 3 and the LCD 206) from the OS 14. The OS 14 outputs the display position and the size of each of the applications in association with at least one of a name and an ID of the application to the trimmed area determining unit 34. The trimmed area determining unit 34 already knows at least one of the name and the ID of the whiteboard application 12. Thus, the trimmed area determining unit 34 determines (decides) the area to be trimmed (a cutout area) on the basis of the display position and the size of the application other than the whiteboard application 12. The trimmed area determining unit 34 notifies the trimming unit 35 of the area to be trimmed. In the case where the document display application 11 is determined in advance, the display area of the document display application 11 may be acquired and cut out.

From the image data of the entire screen 43 captured by the screen capture unit 32, the trimming unit 35 trims the area to be trimmed that is notified by the trimmed area determining unit 34. In this way, only the screen 41 of the document display application 11 can be trimmed from the image data of the entire screen 43. Trimming refers to at least one of cutting out and acquiring a part of an image.

The image saving unit 31 saves the image data of the screen 41 of the document display application 11 in the image saving location 36 specified by the file path.

<<Server>>

The server 50 includes a communicating unit 51, a whiteboard management unit 52, a whiteboard data unit 53, and an object synthesizing unit 54. Each of these units of the server 50 corresponds to at least one of a function and a unit that is realized when any of the components illustrated in FIG. 4 runs by the command from the CPU 201 that follows the program loaded onto the memory 202 from the HDD 209.

The communicating unit 51 exchanges the various types of the information with the information processing apparatus 10. For example, the communicating unit 51 transmits the screen information written in HTML, CSS, and JavaScript® to the information processing apparatus 10. In addition, the communicating unit 51 receives the handwritten information input by the user from the information processing apparatus 10.

The whiteboard management unit 52 manages the whiteboard. The whiteboard management unit 52 has functions of creating and deleting the whiteboard. For example, when the information processing apparatus 10 outputs a request to generate the new whiteboard, the whiteboard management unit 52 creates the whiteboard. When it is assumed that the single URL corresponds to the single whiteboard for ease of the description, the whiteboard management unit 52 allocates the new URL to the meeting and generates the screen information of the whiteboard so as to generate the whiteboard.

The whiteboard management unit 52 stores an IP address of a connection source when accepting access to the above URL, or stores the IP address of the connection source at the time when the connection source log in to the server 50, for example. Then, the whiteboard management unit 52 keeps the IP address of each of these information processing apparatuses 10 in association with the URL of the whiteboard. At least one whiteboard is generated for one meeting, and the same whiteboard is displayed on the information processing apparatuses 10, each of which is connected to the URL of the whiteboard. The communicating unit 51 in the server 50 transmits the same screen information (including the handwritten information) to the information processing apparatuses 10 at the IP addresses that are associated with the URL of the whiteboard.

Meanwhile, when the information processing apparatus 10 outputs a request to delete the whiteboard, the whiteboard management unit 52 deletes the whiteboard.

In addition to the IP address of the information processing apparatus 10, the whiteboard management unit 52 may manage a user ID, which determines the user of the information processing apparatus 10, in association with the URL of the whiteboard. For example, in a situation where the whiteboard is prepared for each of the meetings, the server 50 generates a URL for access to the relevant whiteboard for each of the meetings. In the case where the meeting and the user ID are associated with each other, the whiteboard management unit 52 presents the URL of the meeting relevant to the user ID to the user when accepting the user ID. In this way, the user can access to the whiteboard that is relevant to the meeting. The user ID is identification information use to identify or determine the user. ID is an abbreviation for identification and means one of an identifier and the identification information. The ID is a name, a symbol, a character string, a numerical value, or a combination of one or more of the name, the symbol, the character string, or the numerical value used to uniquely distinguish a particular target from a plurality of targets. The same applies to the following IDs. Alternatively, the whiteboard management unit 52 may manage a communication ID in association with the URL of the whiteboard for a purpose of identifying a communication source.

The whiteboard data unit 53 manages the data for each of the whiteboards. The data is displayed on the whiteboard and thus includes the handwritten information, a text note, the image data, and the like, for example. The whiteboard data unit 53 manages contents and the display positions of such data for each of the whiteboards.

The object synthesizing unit 54 uses the data managed by the whiteboard data unit 53 and generates the screen information. For example, in the case where the plurality of strokes overlap each other, the plurality of strokes are synthesized into a single object. In this way, image quality is improved in terms of enlargement, reduction, rotation, and the like.

A Canvas element is available as an HTML element suitable for the whiteboard. The Canvas element is used when a figure or the like is drawn by scripting using JavaScript®. The object synthesizing unit 54 monitors the data of the whiteboard data unit 53 and generates the screen information every time new data is added. When the new screen information is generated, the communicating unit 51 transmits the new screen information to each of the information processing apparatuses 10 used by the meeting participants. Thus, the meeting participants can share the data displayed on the whiteboard application 12 almost in real time.

<Custom URI Scheme>

Next, a description will be made on the custom URI scheme. The custom URI scheme is a URI scheme that is customized. The URI scheme is an initial portion of a URI (or may be a Uniform Resource Locator (URL)) that represents a location of a resource on the Internet, and is a notation representing means for reaching the resource. Normally, reserved words such as http, file, or mailto is specified as the URI. In contrast, the custom URI schemes can represent the resource with the arbitrary URI.

FIGS. 7A and 7B are examples of explanatory views of the custom URI scheme according to the present embodiment. With reference to FIGS. 7A and 7B, a description will be made on a case where the OS 14 is Android®. FIG. 7A is an example of a manifest of the auxiliary application 13 according to the present embodiment. The manifest is a file in which various types of the information on a name, an icon, functions, and the like of the application are described. The manifest is written in XML. A portion on a first line through a third line of an <intent-filter> tag written in XML includes fixe phrases, a writing format of which is determined. The description on a fourth line is a description by which the OS 14 activates the auxiliary application 13 using the custom URI scheme.

<data android: scheme="subapp" android:host= "filepath"/>

In the above description, "subapp" specifies the auxiliary application 13 (the identification information of the auxiliary application 13), and "filepath" represents the name of the information notifies to the auxiliary application 13.

FIG. 7B illustrates an example of the custom URI scheme according to the present embodiment.

subapp://filepath?id=/foo/bar/001/001.jpg

An initial portion "subapp" specifies the auxiliary application 13, "id=/foo/bar/001/001.jpg" following "filepath" specifies that the information notified to the auxiliary application 13 is included in a variable "filepath" and that a value of the variable is the "/foo/bar/001/001.jpg".

A procedure that the whiteboard application 12 uses the custom URI scheme to activate and notify the auxiliary application 13 of the file path is as follows.

(1) The capture instructing unit 26 in the whiteboard application 12 notifies the OS 14 of the custom URI scheme in FIG. 7B.

(2) The OS 14 searches the manifests of the applications for the application specified by "subapp" in the custom URI scheme and determines the auxiliary application 13.

(3) Once the auxiliary application 13 can be determined, the OS 14 executes an executable file of the auxiliary application 13 so as to activate the auxiliary application 13.

(4) The capture instruction accepting unit 33 in the auxiliary application 13 executes processing to acquire the custom URI scheme from the OS 14 at the time of activation.

(5) The capture instruction accepting unit 33 continues to acquire the file path of a subsequent portion including "id" in the custom URI scheme.

Just as described, the whiteboard application 12 activates the auxiliary application 13 via the OS 14, and the auxiliary application 13 can acquire the file path. Once being activated, the auxiliary application 13 starts capturing the entire screen 43 (automatically) even without the explicit capture instruction. Thus, the custom URI scheme corresponds to the capture instruction. Alternatively, the whiteboard application 12 may notify the auxiliary application 13 of the explicit capture instruction via the OS 14.

<Operation Procedure>

Figure 8:
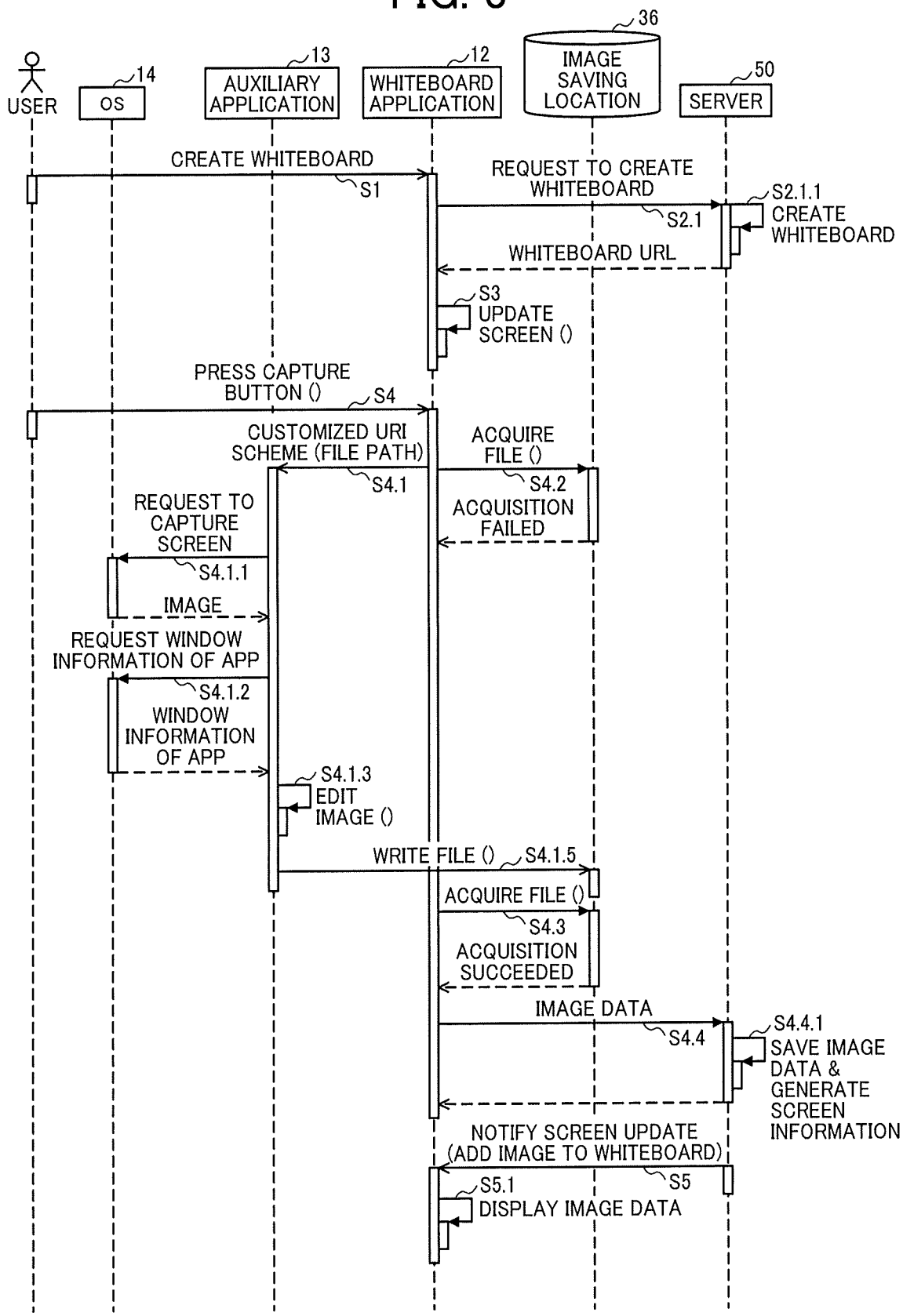
FIG. 8 is a sequence diagram illustrating an example of an operation in which a whiteboard application and an auxiliary application capture image data of a screen of a document display application, according to an embodiment of the present disclosure.

Next, a description will be made on an overall operation procedure of the communication system 100 with reference to FIG. 8. FIG. 8 is a sequence diagram illustrating an example of an operation in which the whiteboard application 12 and the auxiliary application 13 capture the image data of the screen of the document display application 11. Operation of FIG. 8 is initiated when the user holds the meeting.

Prior to the meeting, the user operates the information processing apparatus 10 to activate the whiteboard application 12. The user who operates the information processing apparatus 10 may perform a login operation to the server 50.

In the description of the present disclosure, the information processing apparatus 10 may not communicate with the information processing apparatus 10 at a destination. In the case where the information processing apparatus 10 can communicate with the server 50, the information processing apparatus 10 can capture the screen of the document display application 11 and display the screen of the document display application 11 on the whiteboard application 12 of the own information processing apparatus 10.

S1: When the user logs into the server 50, the user operates the whiteboard application 12 to create the new whiteboard. For example, the user creates the whiteboard that will be used at the meeting. The user can also create the plurality of whiteboards for the single meeting.

S2.1: The communicating unit 22 in the whiteboard application 12 accesses the URL at which the communicating unit 22 requests the server 50 to create the whiteboard. For example, the communicating unit 22 accesses a predetermined resource in the server 50 with HTTP to transmit a whiteboard creation request. An example of the URL for requesting to the server 50 will be described below.

http://server/kaigi/createKaigi

The whiteboard creation request may be provided in a form of a meeting creation request.

S2.1.1: The communicating unit 51 in the server 50 receives the whiteboard creation request, and the whiteboard management unit 52 in the server 50 creates the new whiteboard. For example, the whiteboard management unit 52 creates the whiteboard that will be used at the meeting. It is needless to say that a physically-existing whiteboard is not created, but a virtual whiteboard is created on the server 50. For example, the web application that has a function of allowing the user to write the handwritten information or to display the image by the Canvas element, JavaScript®, and the like corresponds to the whiteboard.

The whiteboard is created at a predetermined URL so as to allow one or more of the information processing apparatuses 10 to access the whiteboard. An example of the URL of the whiteboard will be described below. A portion "k001" in this URL is a meeting ID.

http://server/kaigi/k001

The whiteboard management unit 52 manages the IP address of one or more of the information processing apparatuses 10 used by the meeting participants in association with the URL of the whiteboard. The communicating unit 51 in the server 50 transmits the URL of the whiteboard to the whiteboard application 12. The communicating unit 51 in the server 50 also transmits the URL of the whiteboard to one or more of the information processing apparatuses 10 used by the meeting participants participating in the same meeting.

Figures 10, 11A, 11B, 11C:
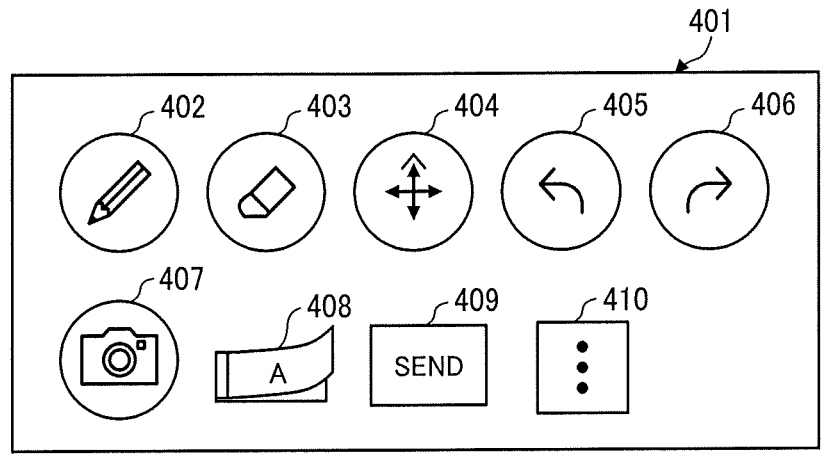
FIG. 10 is a view of an example of a menu that is displayed by the whiteboard application according to an embodiment of the present disclosure.
FIGS. 11A, 11B, and 11C are views for explaining an example of how the image data of the screen of the document display application is displayed, according to an embodiment of the present disclosure.

S3: When receiving the URL of the whiteboard, the communicating unit 22 in the whiteboard application 12 starts communication with the URL of the whiteboard. In this way, the whiteboard application 12 acquires the screen information including the Canvas element and JavaScript® from this URL. That is, the whiteboard application 12 acquires the screen information including the Canvas element and JavaScript® to implement the function as the whiteboard application 12 (the web app). The newly created whiteboard has the pure white screen and the menu with the capture button 407 and the like. FIG. 10 illustrates an example of the menu according to the present embodiment. The menu is drawn on a system layer of Android®. The menu is displayed in a higher layer than a normal Android application (the native application and the web browser).

Referring to FIG. 8, the description has been made on the procedure in which the user creates the new whiteboard; however, the user can also reuse the existing whiteboard. In order to reuse the existing whiteboard, the whiteboard may be associated with the IP address of the information processing apparatus 10 and the user ID (or the communication ID). The whiteboard management unit 52 provides the information processing apparatus 10 with a list of the URLs of the whiteboards associated with the user ID (or the communication ID) of the logged-in user. Thus, the user can select the URL of the whiteboard (corresponding to the meeting when seen from the user) that the user wishes to resume. Because the URL of the whiteboard selected by the user is also transmitted to the other information processing apparatuses 10 used by the participants of the same meeting, each of the users who participate in the meeting can resumes the meeting by sharing the same whiteboard.

S4: It is assumed that, during the meeting, the user displays the document on the document display application 11 and wishes to share the document or to paste the document to the whiteboard. The user presses the capture button 407 displayed by the whiteboard application 12. The operation accepting unit 24 in the whiteboard application 12 accepts pressing of the capture button 407. Hereinafter, the procedure described with reference to FIG. 7 will be executed. The image data of the entire screen 43 of the display device (one of the display 3 and the LCD 206) is captured.

S4.1: The capture instructing unit 26 in the whiteboard application 12 notifies the OS 14 of the custom URI scheme to activate the auxiliary application 13, and also notifies the auxiliary application 13 of the file path. Note that communication processing of the whiteboard application 12, the auxiliary application 13, and the OS 14 is omitted in FIG. 8.

S4.1.1: The capture instruction accepting unit 33 in the auxiliary application 13 requests the screen capture unit 32 to capture the screen. Consequently, the screen capture unit 32 calls the API of the OS 14 to request capturing of the entire screen 43. For example, in Android®, the entire screen 43 can be captured by the API referred to as a MediaProjection API. The screen capture unit 32 acquires the image data of the entire screen 43 from the OS 14.

S4.1.2: The image data acquired from the OS 14 also includes the screen of the whiteboard application 12. Thus, the capture instruction accepting unit 33 in the auxiliary application 13 requests the trimmed area determining unit 34 to determine the area to be trimmed such that only the screen 41 of the document display application 11 is trimmed. The trimmed area determining unit 34 requests the window information of the application from the OS 14. The window information of the application is information on the display position and the size of a window of the application running on the OS 14. FIGS. 9A and 9B illustrate examples of the window information of the application according to the present embodiment. In this way, the trimmed area determining unit 34 acquires the window information of the application.

S4.1.3: The trimmed area determining unit 34 transmits the area to be trimmed to the trimming unit 35. Consequently, the trimming unit 35 trims the area to be trimmed from the image data of the entire screen 43 captured by the screen capture unit 32. In this way, the image data at only includes the screen 41 of the document display application 11 is acquired.

In the case where a file format default of the image data is large such as a bitmap (BMP) format, the image saving unit 31 may encode (compress) the image data of the screen 41 of the document display application 11 into Joint Photographic Exerts Group (JPEG) in consideration of a transmission load between the information processing apparatus 10 and the server 50.

S4.1.5: The image saving unit 31 saves the image data of the screen 41 of the document display application 11 in the image saving location 36 in accordance with the file path accepted by the capture instruction accepting unit 33.

S4.2 and S4.3: The image acquiring unit 25 in the whiteboard application 12 repeatedly attempts to acquire the image data from the image saving location 36. This is because it is difficult for the image acquiring unit 25 to know at which timing the image data is saved in the image saving location 36. Because the image acquiring unit 25 is notified of the file path from the capture instructing unit 26, the image acquiring unit 25 polls until the file (the image data) is saved in the file path of the image saving location 36. For example, reading of the image data is failed in step S4.2, and reading of the image data is succeeded in step S4.3. Because the file path includes a file name of the image data, the image acquiring unit 25 can uniquely determine the file of the image data.

S4.4: When the image acquiring unit 25 acquires the image data, the communicating unit 22 in the whiteboard application 12 transmits the image data to the URL of the whiteboard (the URL of the meeting) notified in step S2.1.1. The communicating unit 22 may transmit the display position of the image data on the whiteboard together with the image data. This is because the whiteboard can be scrolled vertically and horizontally, and thus the whiteboard is possibly displayed on outside of the display area of the display device (one of the display 3 and the LCD 206) depending on the position where the image data is pasted. For example, an upper left corner of the display area of the whiteboard that is currently displayed on the display device (one of the display 3 and the LCD 206) by the information processing apparatus 10 is set as the display position of the image data. Alternatively, the coordinates included in the display area of the whiteboard are set as the display position of the image data. In this way, when the server 50 transmits the screen information to the information processing apparatus 10, the image data of the document display application 11 is displayed on the screen 42 of the whiteboard application.

The information processing apparatus 10 (the information processing apparatus 10 that only receives the image data) at the other site that does not capture the screen of the document display application 11 may not be the same as the information processing apparatus 10 in which the screen of the document display application 11 is captured in the display area of the whiteboard displayed on the display device (one of the display 3 and the LCD 206). Thus, the image data of the screen of the document display application 11 may not be displayed on the information processing apparatus 10 at the other site. In this case, the user of the other information processing apparatus 10 can display the image data of the screen 41 of the document display application 11 by scrolling the whiteboard.

Even after the image data is displayed on the screen 42 of the whiteboard application, an arbitrary user can change the display position of the image data on the whiteboard application 12 with the Canvas element. In this case, the last changed display position is transmitted to the server 50 and is reflected to each of the information processing apparatuses 10.

In addition, because the user can change the display position of the image data, the server 50 may arbitrarily determine the display position. In this case, the whiteboard application 12 may not transmit the display position to the server 50.

In the case where the image data of the screen 41 of the document display application 11 is not shared by the plurality of information processing apparatuses 10, the information processing apparatus 10 may not transmit the image data to the server 50. The whiteboard application 12 can read a local file saved in the image saving location 36 and display the local file on the display device (one of the display 3 and the LCD 206).

In the case where the communicating unit 22 in the whiteboard application 12 succeeds in transmission of the image data (for example, in the case where the communicating unit 22 receives an HTTP status code of 200), the communicating unit 22 notifies the image acquiring unit 25 of the success, and the image acquiring unit 25 deletes the image data (both of BMP and JPEG) in the image saving location 36. In this way, a memory area can be freed.

S4.4.1: The communicating unit 51 in the server 50 receives the image data. The whiteboard data unit 53 saves the image data and the display position for each of the URLs of the whiteboards. Because the whiteboard data unit 53 saves the new data, the object synthesizing unit 54 generates the screen information. For example, the object synthesizing unit 54 specifies the display position and pastes the image data to a Canvas.

S5: The communicating unit 51 in the server 50 transmits an update of the screen information (for example, notification of a change in the Canvas that adds the image to the whiteboard). In the normal HTTP communication, a client initiates the communication. In the normal HTTP communication, a client initiates the communication. However, in order to update the whiteboard in real time, a communication protocol such as WebSocket, Asynchronous JavaScript and XML (AJAX), or COMET is used to initiate the data transmission from the server 50.

S5.1: The communicating unit 22 in the whiteboard application 12 receives the updated screen information, and the display control unit 21 displays the image data included in the screen information on the whiteboard.

With the processing as described above, the whiteboard application 12 can display the image data of only the screen 41 of the document display application 11. The user can share the image data of the screen 41 of the document display application 11 with the other users by a single button operation.

<Area to be Trimmed>

A description will be supplemented on the area to be trimmed with reference to FIGS. 9A and 9B. FIG. 9A illustrates the example of the screen that is displayed on the display device (one of the display 3 and the LCD 206) of the information processing apparatus 10. In FIG. 9A, the screen 41 of the document display application 11 is displayed on a left side, and the screen 42 of the whiteboard application 12 is displayed on a right side. There is a case where such a screen of each of the applications is referred to as the window.

The OS 14 manages the display position and the size of each of the windows as the window information in real time. FIG. 9B illustrates an example of the window information of each of the applications. Coordinates of an upper left corner of the document display application 11 are (0, 20), a window width of the document display application 11 is 500 pixels, and a window height of the document display application 11 is 500 pixels. Coordinates of an upper left corner of the whiteboard application 12 are (500, 20), a window width of the whiteboard application 12 is 200 pixels, and a window height of the whiteboard application 12 is 500 pixels.

The trimmed area determining unit 34 determines the area to be trimmed on the basis of such window information. An application name of the whiteboard application 12 is set in the trimmed area determining unit 34 (the application name of the whiteboard application 12 is known to the auxiliary application 13). Thus, the trimmed area determining unit 34 determines the application other than the whiteboard application 12. In FIG. 9B, the document display application 11 is determined. The trimmed area determining unit 34 determines the window information (the display position and the size) of the document display application 11 as is as the area to be trimmed. The area to be trimmed may be determined slightly smaller or larger than the window information. After trimming, a portion that seems to be a toolbar may be trimmed from the area to be trimmed. In the case where a boundary line is displayed between the right-half window and the left-half window, a boundary line portion may automatically be cut out. Furthermore, in addition to the display area of the web browser 15, a display area of the toolbar or the like displayed by the OS 14 may be acquired from the OS 14 and cut out so as not to include the display area of the tool bar.

In the case where the display position of the screen of the document display application 11 is determined in advance, the auxiliary application 13 may not acquire the window information from the OS 14. For example, such a case is that the document display application 11 is displayed on a left half of the display device (one of the display 3 and the LCD 206) and the whiteboard application 12 is displayed on a remaining right half of the display device (one of the display 3 and the LCD 206). In this case, the trimming unit 35 in the auxiliary application 13 may cut out a left half of the entire screen 43. Even in the case where the arbitrary display position is determined in advance, the trimming unit 35 can easily cut out the screen of the document display application 11. A user interface (UI) used to specify the area may be presented to the user, and input from the user may be accepted to determine the area to be trimmed.

As illustrated in FIG. 9B, the window information includes the display position and the size of the area displayed on the display device (one of the display 3 and the LCD 206). However, there is a case where at least one of the whiteboard application 12 and the document display application 11 expands beyond the area of the display device. That is, an area that is not displayed (a non-display range) possibly exists. Because the size of the whiteboard application 12 is set by the Canvas, for example, the whiteboard application 12 can also have the size that is actually regarded as infinite.

<Menu>

Next, a description will be supplemented on the menu provided by the whiteboard application 12 with reference to FIG. 10. FIG. 10 is a view of an example of a menu 401 that is displayed by the whiteboard application 12 according to the present embodiment. The menu 401 includes a pen button 402, an eraser button 403, a screen moving button 404, a return button 405, a forward button 406, the capture button 407, a character note button 408, a business application linkage button 409, and a setting button 410. The pen button 402 is a button for drawing the handwritten information (the stroke). The eraser button 403 is a button for erasing the handwritten information. The screen moving button 404 is a button for displaying an area that cannot be displayed on the display 3 (the whiteboard application 12 can have the theoretically infinite size) on the display 3. The return button 405 is a button for canceling an operation content and returning to a state before the operation. The forward button 406 is a button for restoring the operation content and returning to the state after the operation. The capture button 407 is a button for capturing the image data of only the screen 41 of the document display application 11. The character note button 408 is a button for displaying a software keyboard and inputting text. The business application linkage button 409 is a button for transmitting the URL of the meeting to a cloud service (a cloud service other than the server 50 in the present embodiment) and an e-mail. The setting button 410 is a button for accepting various settings.

As described above, the user can press the capture button 407 on the menu to capture the image data of the screen 41 of the document display application 11.

<Method for Displaying Image Data>

A description will be made on a method for displaying the image data of the screen of the document display application 11 with reference to FIGS. 11A, 11B, and 11C. In FIGS. 11A, 11B, and 11C, the Canvas element of HTML5 is illustrated as an example. FIG. 11A illustrates a description for defining a Canvas node according to the present embodiment. "Id="c1"" is identification information of the Canvas, "width="300"" is the width of the Canvas, and "height="300"" is the height of the Canvas. Because the width and the height are arbitrarily set, for example, the system administrator can set the size of the Canvas, that is, the size of the whiteboard.

FIG. 11B illustrates an example of a description for displaying the image on the Canvas by JavaScript® according to the present embodiment. A first line represents processing to acquire the Canvas node in FIG. 11A as a drawing target. A second line represents processing to store two-dimensional (2D) context in an object ctx by a getContext method. Various JavaScript® methods are adopted in this 2D context (ctx). In this way, not only the image data can be pasted to the Canvas, but also the user can draw a line, the figure, and the like.

FIG. 11C illustrates an example of a description of pasting the image data to the Canvas by JavaScript® according to the present embodiment. In FIG. 11C, ctx represents the Canvas, and drawImage is a method for displaying "img" as the image data on coordinates (x, y). The image data of the screen of the document display application 11 transmitted by the information processing apparatus 10 is stored in "img".

The coordinates (x, y) represent the display position of the image data of the screen 41 of the document display application 11 with the upper left corner of the Canvas being a reference, and the coordinates (x, y) are transmitted from the information processing apparatus 10 in the present embodiment. In the case where the display position is not transmitted from the information processing apparatus 10, the server 50 may determine the display position in a manner to prevent image data pieces from overlapping each other, or may automatically determine the display position of each of the image data pieces in accordance with order of the transmitted image data units (for example, the coordinates are shifted downward by the image size).

The object synthesizing unit 54 uses the descriptions as illustrated in FIGS. 11A, 11B, and 11C to display the image data on the whiteboard.

The image data can be enlarged or reduced in size on the Canvas.

ctx.drawImage(img, dx, dy, dw, dh)

These dw and dh are arguments that respectively specify the width and the height of the image data (img). Accordingly, the object synthesizing unit 54 in the server 50 can enlarge or reduce the size of the image data.

In addition, the image data can be trimmed on the Canvas.

ctx.drawImage (img, sx, sy, sw, sh, dx, dy, dw, dh)

Coordinates (sx, sy) at the upper left corner are used for trimming, and sw and sh respectively specify the width and the height of the area to be trimmed. Thus, the image data can be trimmed by the server 50 not by the auxiliary application 13. In this case, the whiteboard application 12 acquires the window information of the document display application 11 from the auxiliary application 13 with the image saving location 36 as shared memory, and transmits sx, sy, sw, sh together with the image data to the server 50.

<Display Example of Screen of Document Display Application>

Figure 12B:
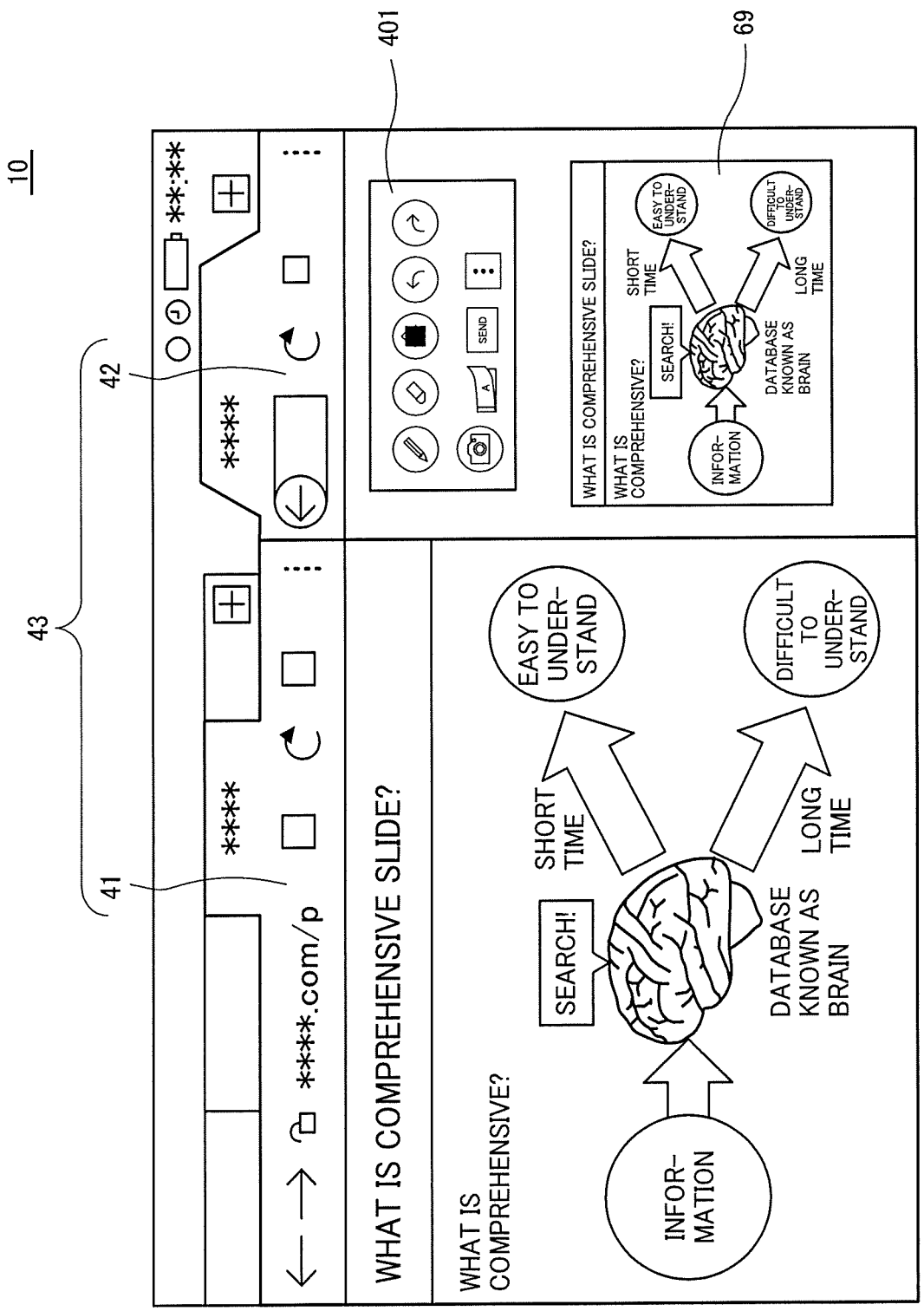

FIGS. 12A and 12B are views of display examples of the image data displayed by the whiteboard application 12. FIG. 12A illustrates a display example at a time of capturing the screen 41 of the document display application 11 according to the present embodiment, and FIG. 12B illustrates an example of the image data that is captured by the auxiliary application 13 and displayed by the whiteboard application 12 according to the present embodiment. When FIGS. 12A and 12B are compared, it can be confirmed that the whiteboard application 12 displays image data 69 of the screen of the document display application 11.

<Acquisition of Part of Screen of Document Display Application>

There is a case where the user wishes to display only a part of the screen of the document display application 11 on the whiteboard rather than the entire screen of the document display application 11. In response to such a request, the auxiliary application 13 can accept designation of the coordinates.

Figure 13A:
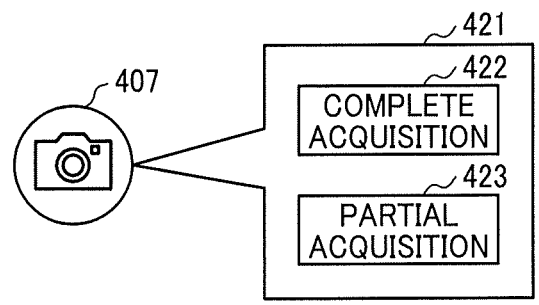
FIGS. 13A and 13B are views for explaining an example of how the image data of a part of the screen of the document display application is acquired, according to an embodiment of the present disclosure.
Figure 13B:
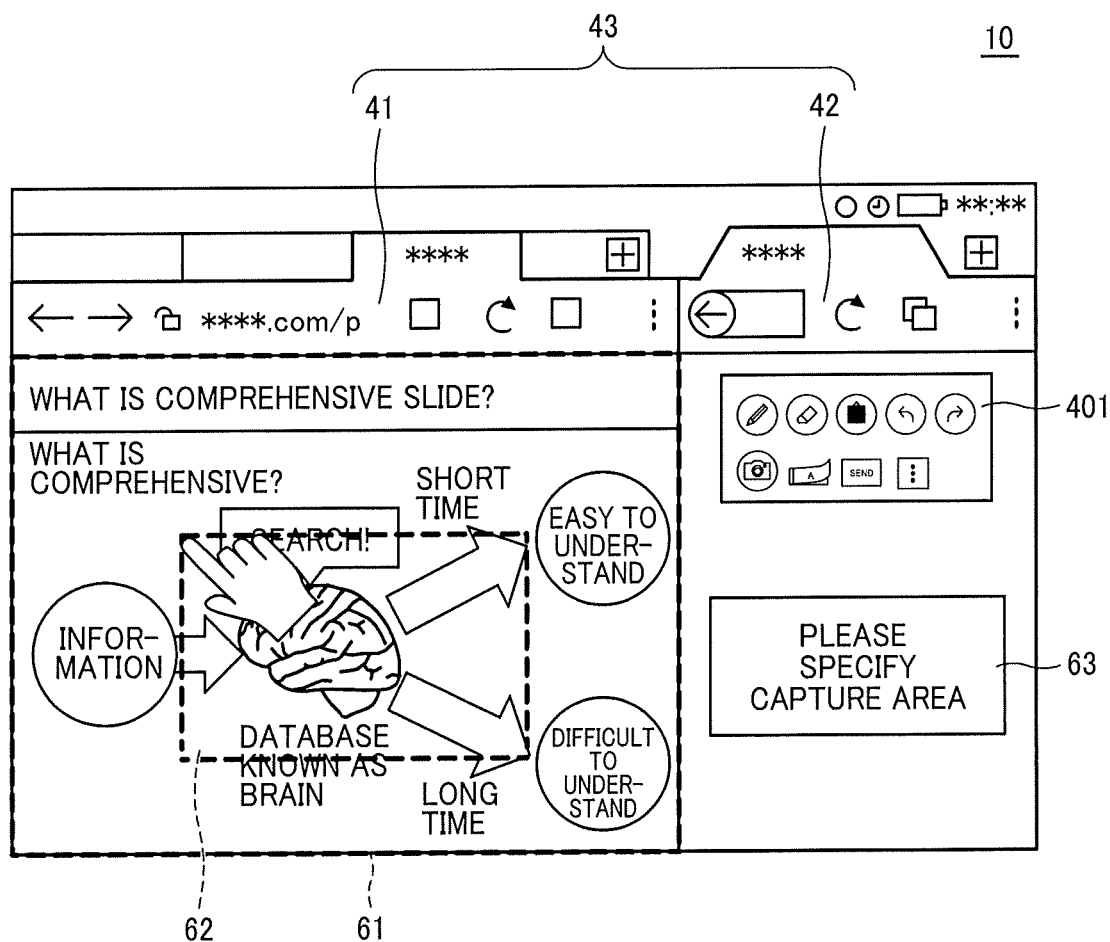

FIGS. 13A and 13B are examples of explanatory views of a method for acquiring the image data of a part of the screen of the document display application 11. FIG. 13A illustrates an example of a pop-up menu 421 according to the present embodiment, and the pop-up menu 421 is displayed when the capture button 407 is pressed. When the user presses the capture button 407, the operation accepting unit 24 accepts pressing of the capture button 407, and the display control unit 21 displays the pop-up menu 421. The pop-up menu 421 includes a complete acquisition button 422 and a partial acquisition button 423. In the case where the complete acquisition button 422 is pressed, the entire screen 41 of the document display application 11 is captured in the same manner as the above description. The screen of the document display application 11 may be captured not only when pressing of the button is acquired but also when a gesture (one of a combination and drag and drop or a Z-shaped gesture) is accepted. For example, in the case where a gesture of tracing the screen in a manner to cross a boundary line between the document display application 11 and the web browser 15 is accepted, the screen of the document display application 11 is captured.

In the case where the partial acquisition button 423 is pressed, the trimmed area determining unit 34 in the auxiliary application 13 displays a transparent screen 61 for accepting designation of the area by the user on the display device (one of the display 3 and the LCD 206). FIG. 13B illustrates an example of the transparent screen 61 according to the present embodiment, and the transparent screen 61 is displayed in a superimposed manner on the document display application 11. The transparent screen 61 only needs to cover at least the entire screen of the document display application 11. As described above, the window information of the document display application 11 can be acquired from the OS 14.

Meanwhile, the trimmed area determining unit 34 in the auxiliary application 13 displays a message 63 such as "Please specify the capture area" on the display device (one of the display 3 and the LCD 206). In this way, the user grasps that the user can touch the transparent screen 61 and specify the capture area. For example, the user may specify an upper left corner and a lower right corner of a capture area 62. Alternatively, when the user draws a circle, the user may set a circumscribed rectangle of the circle as the capture area 62.

The trimmed area determining unit 34 in the auxiliary application 13 determines the capture area 62 acquired from the transparent screen 61 as the area to be trimmed. Thus, the whiteboard application 12 can display the image data in the area specified by the user.

The trimmed area determining unit 34 may make the capture area 62 translucent, change brightness of the capture area 62, or surround the capture area 62 with a dotted line so as to emphasize the specified capture area 62. The transparent screen 61 may not be completely transparent but be translucent. In this way, the user can grasp the area in which the capture area 62 can be specified.

<Acquisition of Non-Display Screen of Document Display Application>

The description has been made on the method for acquiring the part of the screen of the document display application 11 with reference to FIG. 13A and FIG. 13B. However, there is a case where the user wishes to capture a non-display screen that the document display application 11 cannot display on the display device (the display 3 or the LCD 206).

Figure 14:
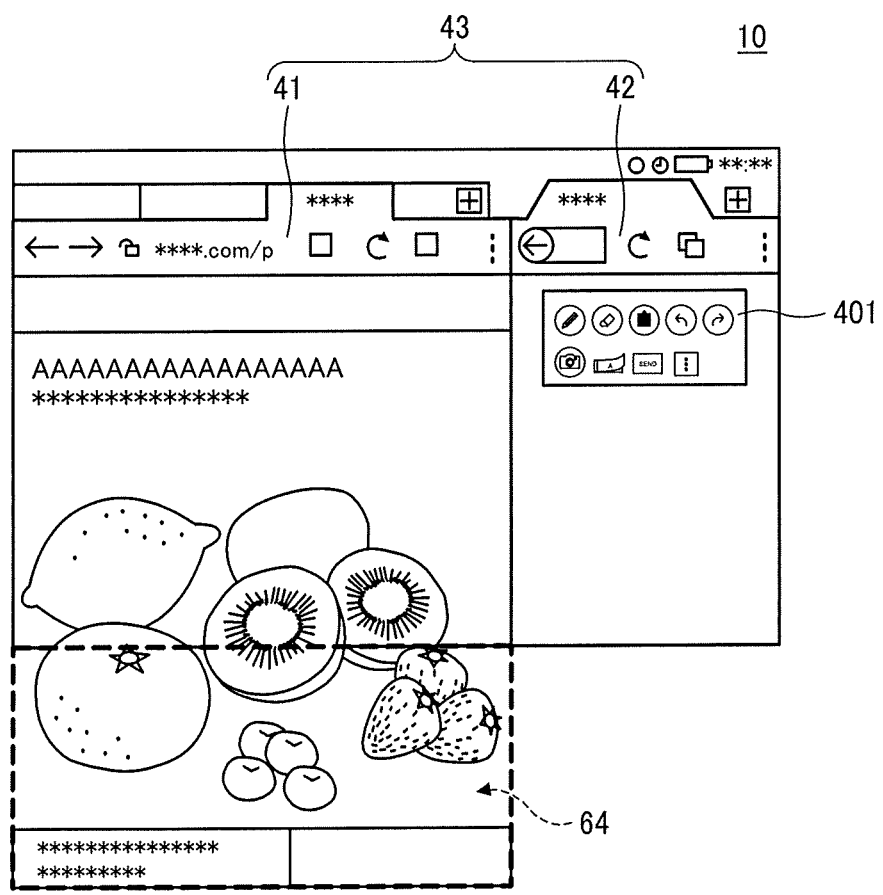
FIG. 14 is a view for explaining an example of how a non-display screen of the document display application is acquired, according to the embodiment of the present disclosure.

FIG. 14 is an example of an explanatory view of a method for acquiring the non-display screen of the document display application 11 according to the present embodiment. In FIG. 14, the document display application 11 displays the screen. However, a non-display area 64 that cannot be displayed on the display device (one of the display 3 and the LCD 206) continues downward. Such a situation is likely to occur in the case where the document display application 11 is the web browser 15, for example. There is a case where the user wishes to capture the entire screen displayed by the document display application 11 including the non-display area 64 into the whiteboard application 12.

As a method for capturing the entire screen displayed by the document display application 11 including the non-display area 64, a method in which the auxiliary application 13 acquires the overall size of the document display application 11 from the OS 14 is available. In this method, the display position and the size of only the screen of the document display application 11 can be acquired from the OS 14, and the screen capture unit 32 may capture only the image data of the screen of the document display application 11.

In the case where the OS 14 does not grasp the overall size of the document display application 11, such a fact that the OS 14 acquires the URL accessed by the document display application 11 is used. When the document display application 11 performs the HTTP communication, the document display application 11 communicates with the server 50 through TCP communication. Thus, the web server and a socket are connected. An IP address of the web server is written in the socket. Accordingly, the OS 14 can detect the URL accessed by the document display application 11. The auxiliary application 13 acquires the URL of the web server from the OS 14 and saves the URL of the web server from the OS 14 in the image saving location 36. As a result, the whiteboard application 12 can acquire a URL of a web page that is displayed as the document by the document display application 11. Thus, the whiteboard application 12 can capture the entire screen displayed by the document display application 11 including the non-display area 64 into the whiteboard. An iframe (inline frame) is known as a tag that displays another web page in the whiteboard as the web page.

Just as described, the whiteboard application 12 can capture the entire screen displayed by the document display application 11 including the non-display area 64.

As described so far, the information processing apparatus 10 according to the present embodiment executes the processing similar to the OS 14 using the auxiliary application 13. In this way, the screen of the document display application 11 can be shared on the web browser 15 as the general-purpose application.

<Variations>

A description is given heretofore of an embodiment of the present disclosure. The above-described embodiments are illustrative and do not limit the present disclosure. Thus, numerous additional modifications and variations are possible within the scope of the present disclosure.

For example, in the present embodiment, the whiteboard application 12 transmits the image data of the screen of the document display application 11 to the server 50. However, the auxiliary application 13 may transmit the image data of the screen of the document display application 11 to the server 50.

In the present embodiment, the auxiliary application 13 captures the image data of the screen of the document display application 11. However, in the case where the web browser 15 can execute such processing, the whiteboard application 12 may capture the image data of the screen of the document display application 11.

In the present embodiment, two applications that are the whiteboard application 12 and the document display application 11 display the screens on the display device (one of the display 3 and the LCD 206). However, three applications may display the screens on the display device (the display 3 or the LCD 206). In this case, the auxiliary application 13 captures the screens of the two applications other than the whiteboard application on the basis of the window information and cuts out the screens on the basis of the window information. The same applies to the case where four or more applications are provided.

In the present embodiment, the description has been made on the example in which the screen of the document display application 11 is captured while the screen of the whiteboard application 12 is displayed. However, three applications may display the screens on the display device (one of the display 3 and the LCD 206). Even in the case where the screen of the whiteboard application 12 is not displayed, the image data of the screen of the document display application 11 can be captured.

In the present embodiment, the description has been made by using the Canvas element of HTML5. Instead, WebGL, Scalable Vector Graphics (SVG), FLASH®, or the like may be used.

The auxiliary application 13 may directly capture only the screen of the document display application 11 instead of capturing and trimming the image data of the entire screen 43. At this time, the auxiliary application 13 may use a function of capturing the screen of the active window.

The configuration example as in FIG. 6 is divided according to the main functions so as to facilitate understanding of the processing by the information processing apparatus 10 and the server 50. The embodiment of the present disclosure is not limited by a method for dividing the configuration in processing units or by names of the processing units. The processing of the information processing apparatus 10 and the server 50 can be divided into the more processing units according to the processing contents. The processing of the information processing apparatus 10 and the server 50 can also be divided such that more processing is included in the single processing unit.

According to one or more embodiments of the present disclosure, an information processing apparatus is provided that is capable of easily capturing a part of a screen.

The screen capture unit 32 is an example of image data acquisition means. The trimmed area determining unit 34 is an example of display area acquisition means. The trimming unit 35 is an example of generation means. The display control unit 21 is an example of image data display means. The communicating unit 22 is an example of communication means. The server 50 is an example of a second information processing apparatus. The communicating unit 51 is an example of second communication means. The object synthesizing unit 54 is an example of screen information generation means.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing apparatus that controls display of a plurality of applications on a screen, the information processing apparatus comprising:
    circuitry configured to
        acquire, directly in response to an acquisition request from a second application on a screen displaying a first application display area of a first application and a second application display area of the second application, first image data that at least includes the first application display area of the first application;
        acquire as information regarding the first application display area, a display area that does not include the second application display area of the second application; and
        generate, by extracting from the first image data, second image data that includes only a part of the first image data that corresponds to the acquired information regarding the first application display area of the first application,
    wherein the circuitry is further configured to display the second image data in the second application display area of the second application.

2. The information processing apparatus of claim 1, wherein the circuitry executes a third application to acquire first image data that at least includes the display area of the first application displayed on the screen, acquire information on the display area of the first application, and generate the second image data that includes at least the part of the first image data based on the information on the display area of the first application,
    the first application, the second application, and the third application run on an operating system (OS), and
    the second application configures the circuitry to request the third application to capture the first image data via the OS.

3. The information processing apparatus of claim 2, wherein
    the second application configures the circuitry to use a custom uniform resource identifier (URI) scheme provided by the OS to request the third application to activate and acquire the first image data.

4. The information processing apparatus of claim 2, wherein
    the second application configures the circuitry to notify the third application of saving location specifying information that specifies a saving location in which the second image data is to be stored via the OS, when requesting acquisition of the first image data,
    the third application configures the circuitry to store the second image data in the saving location specified by the saving location specifying information,
    the second application configures the circuitry to acquire the second image data from the saving location, and
    the circuitry is further configured to display the second image data in the second display area of the second application.

5. The information processing apparatus of claim 2, wherein the circuitry is further configured to:
    acquire, from the OS, information on the first display area of the first application and the second display area of the second application;
    determine an application that does not have known identification information of the second application as the first application; and
    acquire the information regarding the first application display area.

6. The information processing apparatus of claim 2, wherein the circuitry is further configured to:
    display at least the first application display area of the first application in a superimposed manner on the screen to accept a cutout area specified by a user; and
    cut out the cutout area from the first image data.

7. The information processing apparatus of claim 2, wherein the circuitry is further configured to:
    acquire the information regarding the first application display area of the first application, the information including a non-display area that cannot be displayed in the first application display area,
    acquire the first image data, the first image data including the non-display area that cannot be displayed in the first application display area; and
    display the second image data, which is generated from the first image data acquired by tag circuitry, in the second application display area.

8. The information processing apparatus of claim 2, wherein the third application acquires an entirety of the screen from the OS as the first image data, and trims the first image data using the location information to generate the second image data.

9. The information processing apparatus of claim 1, wherein the circuitry is further configured to:

communicate with a second information processing apparatus via a network to transmit the second image data, which is generated by the circuitry, to the second information processing apparatus; and display the second image data, which is received from the second information processing apparatus, in the second application display area of the second application.

10. The information processing apparatus of claim 9, wherein the second information processing apparatus is a web server, the second application has a function of a browser, and based on screen information in which processing for displaying the second image data generated by the second information processing apparatus is described by HTML and a script, the circuitry is configured to display the second image data in the second application display area of the second application.

11. The information processing apparatus of claim 10, wherein the circuitry is further configured to:

transmit, to the second information processing apparatus, a display position of the first image data in the second application display area of the second application, when transmitting the second image data, which is generated by the circuitry, to the second information processing apparatus, and based on screen information in which processing for displaying the second image data generated by the second information processing apparatus at the display position is described by HTML and the script, display the second image data at the display position in the second application display area of the second application.

12. The information processing apparatus of claim 11, wherein the circuitry is further configured to transmit, to the second information processing apparatus, coordinates, which are included in the second application display area of the second application, as the display position of the second image data.

13. The information processing apparatus of claim 1, wherein the circuitry is further configured to acquire the first image data based only on an action by a user in the second application display area, without the user selecting a region or a window in the first application display area.

14. The information processing apparatus of claim 13, wherein the circuitry is further configured to acquire the first image data based only on the user selecting or touching a button or icon in the select application display area.

15. A communication system, comprising:

an information processing apparatus for controlling display of a plurality of applications on a screen; and a second information processing apparatus that is communicably connected with the information processing apparatus via a network, wherein the information processing apparatus comprises first circuitry configured to acquire, directly in response to an acquisition request from a second application on a screen displaying a first application display area of a first application and a second application display area of the second application, first image data that at least includes the first application display area of the first application by the first application;

acquire as information regarding the first application display area, a display area that does not include the second application display area of the second application;

generate, by extracting from the first image data, second image data that includes only a part of the first image data that corresponds to the acquired information regarding the first application display area of the first application;

transmit the generated second image data to the second information processing apparatus;

display the second image data in the second application display area of the second application, and the second information processing apparatus comprises second circuitry to receive the second image data; and generate screen information in which processing for displaying the second image data is described by HTML and a script and which is transmitted to the information processing apparatus.

16. An image processing method executed by an information processing apparatus that controls display of a plurality of applications on a screen, the method comprising:

acquiring, directly in response to an acquisition request from a second application on a screen displaying a first application display area of a first application and a second application display area of the second application, first image data that at least includes the fir application display area of the first application;

acquiring, as information regarding the first application display area, a display area that does not include the second application display area of the second application;

generating, by extracting from the first image data, second image data that includes only a part of the first image data that corresponds to the acquired information regarding the first application display area of the first application; and displaying the second image data in the second display area of the second application.

* * * * *